(12) United States Patent
Ansari et al.

(10) Patent No.: US 11,580,057 B2
(45) Date of Patent: Feb. 14, 2023

(54) SUBSYSTEM FOR CONFIGURATION, SECURITY, AND MANAGEMENT OF AN ADAPTIVE SYSTEM

(71) Applicant: Xilinx, Inc., San Jose, CA (US)

(72) Inventors: Ahmad R. Ansari, San Jose, CA (US); Sagheer Ahmad, Cupertino, CA (US)

(73) Assignee: Xilinx, Inc., San Jose, CA (US)

( * ) Notice: Subject to any disclaimer, the term of this patent is extended or adjusted under 35 U.S.C. 154(b) by 150 days.

(21) Appl. No.: 16/666,262

(22) Filed: Oct. 28, 2019

(65) Prior Publication Data
US 2021/0124711 A1   Apr. 29, 2021

(51) Int. Cl.
| | | |
|---|---|---|
| *G06F 15/177* | (2006.01) |
| *G06F 9/00* | (2006.01) |
| *G06F 15/78* | (2006.01) |
| *G06F 1/26* | (2006.01) |
| *G06F 9/4401* | (2018.01) |
| *G06F 11/07* | (2006.01) |
| *G06F 21/57* | (2013.01) |
| *G06F 21/60* | (2013.01) |
| *G06F 21/71* | (2013.01) |
| *G06F 21/76* | (2013.01) |
| *G06F 21/86* | (2013.01) |

(52) U.S. Cl.
CPC ............ *G06F 15/7882* (2013.01); *G06F 1/26* (2013.01); *G06F 9/4418* (2013.01); *G06F 11/0736* (2013.01); *G06F 11/0751* (2013.01); *G06F 11/0772* (2013.01); *G06F 15/7807* (2013.01); *G06F 15/7853* (2013.01); *G06F 21/575* (2013.01); *G06F 21/60* (2013.01); *G06F 21/71* (2013.01); *G06F 21/76* (2013.01); *G06F 21/86* (2013.01); *G06F 2221/034* (2013.01)

(58) Field of Classification Search
CPC ...... G06F 15/7882; G06F 1/26; G06F 9/4418; G06F 11/0736; G06F 11/0751; G06F 11/0772; G06F 15/7807; G06F 15/7853; G06F 21/575; G06F 21/60; G06F 21/71; G06F 21/76; G06F 21/86; G06F 2221/034; H03K 19/17768
See application file for complete search history.

(56) References Cited

U.S. PATENT DOCUMENTS

| | | | | |
|---|---|---|---|---|
| 10,430,225 | B1 * | 10/2019 | Harland | ................ G06F 13/385 |
| 2003/0102495 | A1 | 6/2003 | Huppenthal et al. | |
| 2014/0181458 | A1 | 6/2014 | Loh et al. | |
| 2015/0082063 | A1 * | 3/2015 | Peterson | ................ G06F 3/0689 713/323 |
| 2017/0104770 | A1 * | 4/2017 | Jreij | ........................ H04L 63/20 |

(Continued)

OTHER PUBLICATIONS

Bilski et al., "Device With Data Processing Engine Array", U.S. Appl. No. 15/944,307, filed Apr. 3, 2018, 123 pages.

(Continued)

*Primary Examiner* — Xuxing Chen
(74) *Attorney, Agent, or Firm* — Kevin T. Cuenot

(57) ABSTRACT

An integrated circuit (IC) can include a processor system configured to execute program code, a programmable logic, and a platform management controller coupled to the processor system and the programmable logic. The platform management controller is adapted to configure and control the processor system and the programmable logic independently.

20 Claims, 14 Drawing Sheets

(56) References Cited

U.S. PATENT DOCUMENTS

| | | | |
|---|---|---|---|
| 2018/0217942 A1* | 8/2018 | Fons | H04L 9/16 |
| 2019/0012288 A1* | 1/2019 | Zhao | H05K 7/1487 |
| 2019/0044927 A1* | 2/2019 | Sood | G06F 9/5077 |
| 2019/0096813 A1 | 3/2019 | Lesea et al. | |
| 2019/0196901 A1 | 6/2019 | Arbel | |
| 2019/0303323 A1 | 10/2019 | Swarbrick et al. | |
| 2019/0303328 A1 | 10/2019 | Balski | |
| 2019/0311126 A1* | 10/2019 | Areno | G06F 21/575 |
| 2020/0034538 A1* | 1/2020 | Woodward | G06F 12/0842 |
| 2020/0134185 A1* | 4/2020 | Cho | G06F 21/575 |
| 2021/0081215 A1* | 3/2021 | Schultz | G06F 11/0751 |

OTHER PUBLICATIONS

Swarbrick et al., "Configurable Network-On-Chip for a Programmable Device", U.S. Appl. No. 16/041,473, filed Jul. 20, 2018, 34 pages.

Schultz et al., "Partial Reconfiguration for Network-On-Chip (NOC)", U.S. Appl. No. 16/133,357, filed Sep. 17, 2018, 49 pages.

Javre et al., "Software Defined Multi-Domain Creation and Isolation for a Heterogeneous System-On-Chip", U.S. Appl. No. 15/956,480, filed Apr. 18, 2018, 47 pages.

Ahmad et al., "Adaptive Integrated Programmable Device Platform", U.S. Appl. No. 16/367,108, filed Mar. 27, 2019, 131 pages.

"Xilinx AI Engines and Their Applications," Xilinx, Inc., White Paper WP506(v1.0.2), Oct. 3, 2018, 13 pg.

Versal: The First Adaptive Compute Acceleration Platform (ACAP), Xilinx, Inc. White Paper WP505 (v1.0), Oct. 2, 2018, 21 pg.

"Versal Architecture and Product Data Sheet: Overview," Xilinx, Inc., Datasheet DS950 (v1.0), Oct. 2, 2018, 23 pg.

\* cited by examiner

SUBSYSTEM FOR CONFIGURATION, SECURITY, AND MANAGEMENT OF AN ADAPTIVE SYSTEM

TECHNICAL FIELD

This disclosure relates to integrated circuits (ICs) and, more particularly, to configuration, security, and management of an adaptive system implemented as an IC.

BACKGROUND

A programmable integrated circuit (IC) refers to a type of device that includes programmable logic. An example of a programmable device or IC is a field programmable gate array (FPGA). Some modern programmable ICs have evolved to include programmable logic as a subsystem in combination with one or more other subsystems. For example, some programmable ICs include programmable logic in combination with a hardwired processor. These types of programmable ICs may also be referred to as System-on-Chips or "SoCs."

SUMMARY

In one aspect, an integrated circuit (IC) includes a processor system configured to execute program code, a programmable logic, and a platform management controller coupled to the processor system and the programmable logic. The platform management controller is adapted to configure and control the processor system and the programmable logic independently.

In another aspect, a method includes providing a processor system on an IC, wherein the processor system is configured to execute program code. The method may include providing a programmable logic on the IC and providing a platform management controller on the IC. The platform management controller is coupled to the processor system and the programmable logic and is adapted to configure and control the processor system and the programmable logic independently.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
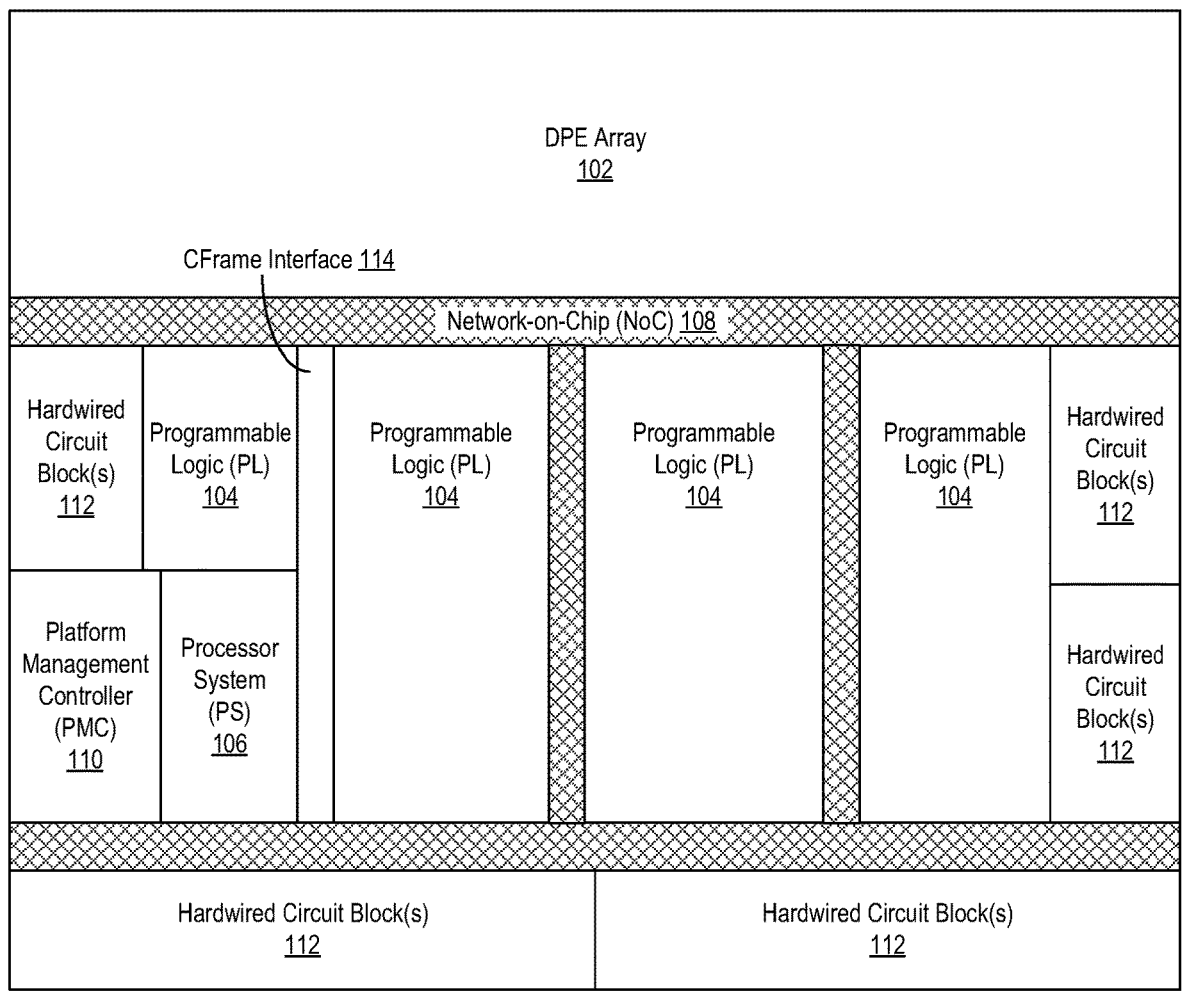
FIG. 1 illustrates an example architecture for a System-on-Chip (SoC) type of integrated circuit (IC).

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to configuration, security, and management of an adaptive system implemented as an IC. In accordance with the inventive arrangements described within this disclosure, a platform management controller (PMC) is incorporated into the IC. The IC, being an adaptive system, includes multiple different subsystems. One or more of these subsystems are programmable. Examples of these subsystems include a processor system (PS) and programmable logic (PL).

The PMC is a subsystem within the IC that is capable of managing each of the other subsystems across the entire IC. For example, the PMC is capable of providing unified and programmable control over power-up, boot/configuration, security, power management, safety monitoring, debugging, and/or error handling throughout the IC for different subsystems. The functions provided by the PMC may also be operable at the device level within each subsystem. Use of the PMC subsystem, which is dedicated to platform management, decouples the PS from the PL. As such, the PS and the PL may be managed, configured, and/or powered on and/or off on an independent basis by the PMC. In other words, the PMC is capable of performing the described operations for the PS independently of the PL and for the PL independently of the PS.

Prior field programmable gate arrays (FPGAs) equipped with processors (e.g., a PS), utilized separate configuration interfaces and separate protocols for controlling and/or managing the PS and the PL. In previous generations of FPGAs that included a PS for executing user applications (e.g., executable program code) and PL for implementing user circuit designs, for example, the configuration of the PL was passed through the PS. In such architectures, the PL was therefore dependent on the PS being powered up and configured (e.g., booted and functional) prior to performing any operations with respect to the PL. With this dependency between the PS and the PL, separation or independent control of the PL from the PS, though desirable in many cases, was not possible. Use of the PMC facilitates decoupling of the PL from the PS.

In another aspect, from a security point-of-view, the PMC is capable of operating as a Root-of-Trust for the entire device (e.g., IC). As an example, the PMC is responsible for authenticating programming image(s) loaded into the device and protecting the device against tampering during operation. By using the PMC as the Root-of-Trust, the PMC is capable of monitoring and validating operation of the PS, the PL, and/or any other subsystem that may be included in the device. Moreover, the Root-of-Trust capabilities, as performed by the PMC, are distinct and separate from each of the PS and the PL and/or any operations performed by the PS and/or PL.

In another aspect, the PMC may be operated on a dedicated power supply. As such, the PMC is powered by a power supply that is separate and independent from the power supply of the PS and the power supply of the PL. This power independence allows the PMC, the PS, and the PL to be protected from one another in terms of electrical noise and glitches (e.g., attack). Further, one or both of the PS and the PL may be powered down (e.g., off completely, suspended, or placed in a lower power hibernate mode) while the PMC continues to operate. The PMC, for example, may be configured to always remain on while other subsystems may be powered on or off. This capability allows any subsystems of the device that have been powered down to wake and be restored to an operational state more quickly and without the need for the entire device to undertake a complete power-up and boot process.

In still another aspect, the PMC is capable of executing firmware. As such, the PMC is configurable by changing the firmware that is loaded and executed by the PMC. Configurability of the PMC in this manner allows the same management hardware (e.g., same PMC architecture) to be used to accommodate devices with different feature sets. Use of firmware also supports configurability and segmentation of global device features such as reset, clocking, and protection in order to offer flexibility in creating separate processing domains (which are distinct from "power domains" that may be subsystem-specific) that may involve a mixture or combination of one or more subsystems of the device.

The PMC supports additional features that are described in greater detail below. For example, the PMC may include a debug interface for a unified debug infrastructure for the device that is operable across subsystems. Use of the debug interface is not dependent on the availability of the PS or the PL. Further, the debug interface and infrastructure is not intrusive on resources of the device that are available to the user (e.g., resources of the PS and/or PL). The PMC may also include security components that may not be accessed by the user applications that are implemented in the device (e.g., within the PS, PL, and/or other subsystems). Because the PMC also provides security, access to the debug interface is protected.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example architecture for a System-on-Chip (SoC) 100. SoC 100 is an example of a programmable IC and an adaptive system. In the example of FIG. 1, the various, different subsystems or regions of SoC 100 illustrated may be implemented on a single die provided within a single integrated package. In other examples, the different subsystems may be implemented on a plurality of interconnected dies provided as a single, integrated package.

In the example, SoC 100 includes a plurality of regions having circuitry with different functionalities. In the example, SoC 100 optionally includes a data processing engine (DPE) array 102. SoC 100 includes PL 104, a PS 106, an optional Network-on-Chip (NoC) 108, a PMC 110, and optionally one or more hardwired circuit blocks 112.

DPE array 102 is implemented as a plurality of interconnected, hardwired, and programmable processors, e.g., an array of DPEs, having an interface to the other regions of the SoC 100. The DPEs within DPE array 102 are hardwired. Each DPE of DPE array 102 includes one or more cores and dedicated memory. The core of a DPE is capable of accessing the memory within the same DPE and the memory of any other DPE that is adjacent to the core of the DPE in the up, down, left, and right directions. The core of a DPE sees each of these memories as a unified region of memory. This facilitates data sharing among DPEs.

The DPEs of the DPE array 102 are interconnected by programmable interconnect circuitry allowing groups of one or more DPEs to be arranged in a group or cluster. For example, the interconnect circuitry may include a configuration network for configuring each DPE (e.g., providing instructions for execution and/or data), a programmable stream network that allows different DPEs in DPE array 102 to communicate using packetized data (e.g., not establishing connectivity on a per-bit basis as is the case with PL 104), and a debug network that allows debug information to be obtained.

The configuration network allows configuration data, e.g., instructions for execution by each DPE, stream switch programming establishing logical links between DPEs, etc., to be loaded into DPE array 102. Each DPE may have different program code to implement one or more different kernels therein. In another aspect, cores of DPEs in the same row may be directly connected by cascade interfaces with a core of an edge DPE of a row being directly connected to a core of another edge DPE in a different row immediately above or below.

PL 104 is circuitry that may be programmed to perform specified functions. As an example, PL 104 may be implemented as field programmable gate array type of circuitry. PL 104 can include an array of programmable circuit blocks. As defined herein, the term "programmable logic" means circuitry used to build reconfigurable digital circuits. Programmable logic is formed of many programmable circuit blocks sometimes referred to as "tiles" that provide basic functionality. The topology of PL 104 is highly configurable unlike hardwired circuitry. Each programmable circuit block of PL 104 typically includes a programmable element (e.g., a functional element) and a programmable interconnect. The programmable interconnects provide the highly configurable topology of PL 104. The programmable interconnect may be configured on a per wire basis to provide connectivity among the programmable circuit blocks of PL 104 and is configurable on a per-bit basis (e.g., where each wire conveys a single bit of information) unlike connectivity among DPEs, for example.

Examples of programmable circuit blocks of PL 104 include configurable logic blocks having look-up tables and registers. Unlike hardwired circuitry described below and sometimes referred to as hard blocks, these programmable circuit blocks have an undefined function at the time of manufacture. PL 104 may include other types of programmable circuit blocks that have also provide basic and defined functionality with more limited programmability. Examples of these circuit blocks may include digital signal processing blocks (DSPs), phase lock loops (PLLs), and block random access memories (BRAMs). These types of programmable circuit blocks, like others in PL 104, are numerous and intermingled with the other programmable circuit blocks of PL 104.

Prior to use, PL 104, e.g., the programmable interconnect and the programmable elements, must be programmed or "configured" by loading data referred to as a configuration bitstream into internal configuration memory cells therein. The configuration memory cells, once loaded with a configuration bitstream, define how PL 104 is configured, e.g., the topology, and operates (e.g., particular functions performed). Within this disclosure, a "configuration bitstream" is not equivalent to program code executable by a processor or computer.

CFrame interface (CFI) 114 is an interface through which configuration data, e.g., a configuration bitstream, may be provided to PL 104 to implement different user-specified circuits and/or circuitry therein. CFI 114 further may be used to initialize memory that is included within PL 104. CFI 114 is accessible by PMC 110 to provide configuration data to PL 104 and to perform memory initialization as described. In some cases, PMC 110 is capable of first configuring PS 106 such that PS 106, once configured by PMC 110, may provide configuration data to PL 104.

PS 106 is implemented as hardwired circuitry that is fabricated as part of SoC 100. PS 106 may be implemented as, or include, any of a variety of different processor types each capable of executing program code. For example, PS 106 may be implemented as an individual processor, e.g., a single core capable of executing program code. In another example, PS 106 may be implemented as a multi-core processor. In still another example, PS 106 may include one or more cores, modules, co-processors, interfaces, controllers, and/or other resources. PS 106 may be implemented using any of a variety of different types of architectures. Example architectures that may be used to implement PS 106 may include, but are not limited to, an ARM processor architecture, an x86 processor architecture, a graphics processing unit (GPU) architecture, a mobile processor architecture, a DSP architecture, or other suitable architecture that is capable of executing computer-readable instructions or program code.

NoC 108 is an interconnecting network for sharing data between endpoint circuits in SoC 100. The endpoint circuits can be disposed in DPE array 102, PL 104, PS 106, and/or in hardwired circuit blocks 112. NoC 108 can include high-speed data paths with dedicated switching. In an example, NoC 108 includes one or more horizontal paths, one or more vertical paths, or both horizontal and vertical path(s). The arrangement and number of regions shown in FIG. 1 is merely an example. NoC 108 is an example of the common infrastructure that is available within SoC 100 to connect selected components and/or subsystems.

NoC 108 provides connectivity to PL 104, PS 106, and to selected ones of hardwired circuit blocks 112. NoC 108 is programmable. In the case of a programmable NoC used with SoC 100, the nets that are to be routed through NoC 108 are unknown until a user circuit design is created for implementation within SoC 100. NoC 108 may be programmed by loading configuration data into internal configuration registers that define how elements within NoC 108 such as switches and interfaces are configured and operate to pass data from switch to switch and among the NoC interfaces to connect the endpoint circuits.

NoC 108 is fabricated as part of SoC 100 and while not physically modifiable, may be programmed to establish connectivity between different master circuits and different slave circuits of a user circuit design. NoC 108, upon power-on, does not implement any data paths or routes therein. Once configured by PMC 110, however, NoC 108 implements data paths or routes between endpoint circuits. NoC 108, for example, may include a plurality of programmable switches that are capable of establishing a packet switched network connecting user specified master circuits and slave circuits. In this regard, NoC 108 is capable of adapting to different circuit designs, where each different circuit design has different combinations of master circuits and slave circuits implemented at different locations in SoC 100 that may be coupled by NoC 108. NoC 108 may be programmed to route data, e.g., application data and/or configuration data, among the master and slave circuits of the user circuit design. For example, NoC 108 may be programmed by PMC 110 to couple different user-specified circuitry together whether implemented using PL 104, PS 106, and/or DPE array 102. Further, NoC 108 is capable of coupling user-specified circuitry with different hardwired circuit blocks 112 and/or with different circuits and/or systems external to the SoC 100.

Hardwired circuit blocks 112 are special-purpose circuit blocks fabricated as part of SoC 100. Though hardwired, hardwired circuit blocks 112 may be configured by loading configuration data into control registers to implement one or more different modes of operation. Examples of hardwired circuit blocks 112 may include input/output (I/O) blocks, transceivers for sending and receiving signals to circuits and/or systems external to SoC 100, memory controllers, and video encoders. Examples of different I/O blocks may include single-ended and pseudo differential I/Os. Examples of transceivers may include high-speed differentially clocked transceivers. Other examples of hardwired circuit blocks 112 include, but are not limited to, cryptographic engines, digital-to-analog converters (DACs), and analog-to-digital converters (ADCs). Hardwired circuit blocks 112 within SoC 100 may be referred to herein from time-to-time as "hard blocks." Hardwired circuit blocks 112 are typically more complex in functionality compared to programmable circuit blocks in PL 104. In addition, there are typically fewer hardwired circuit blocks 112 in SoC 100 compared to programmable circuit blocks, or tiles, of PL 104.

In the example of FIG. 1, PL 104 is shown in four separate regions. In another example, PL 104 may be implemented as a unified region of programmable circuitry. In still another example, PL 104 may be implemented as more than four different regions of programmable circuitry or fewer than four different regions of programmable circuitry. The particular organization of PL 104 is not intended as a limitation. In this regard, SoC 100 includes PL 104 having one or more regions, PS 106, and PMC 110. NoC 108 may be included. DPE array 102 may also be included.

In other example implementations, SoC 100 may include two or more DPE arrays 102 located in different regions of the IC. In still other examples, SoC 100 may be implemented as a multi-die IC. In one example, each subsystem may be implemented on a different die. In another example, one or more or all subsystems may be replicated across each die. The different dies may be communicatively linked using any of a variety of available multi-die IC technologies such as stacking the dies side-by-side on an interposer, using a stacked-die architecture where the IC is implemented as a Multi-Chip Module (MCM), or the like. In the multi-die IC example, it should be appreciated that each die may include a single subsystem, two or more subsystems, a subsystem and another partial subsystem, or any combination thereof. In one example implementation, each die may include a PMC, where the PMC implemented in a die designated as "master" is the master PMC while PMCs implemented in other dies designated as slaves operate as slave PMCs coupled to the master PMC.

Figure 2:
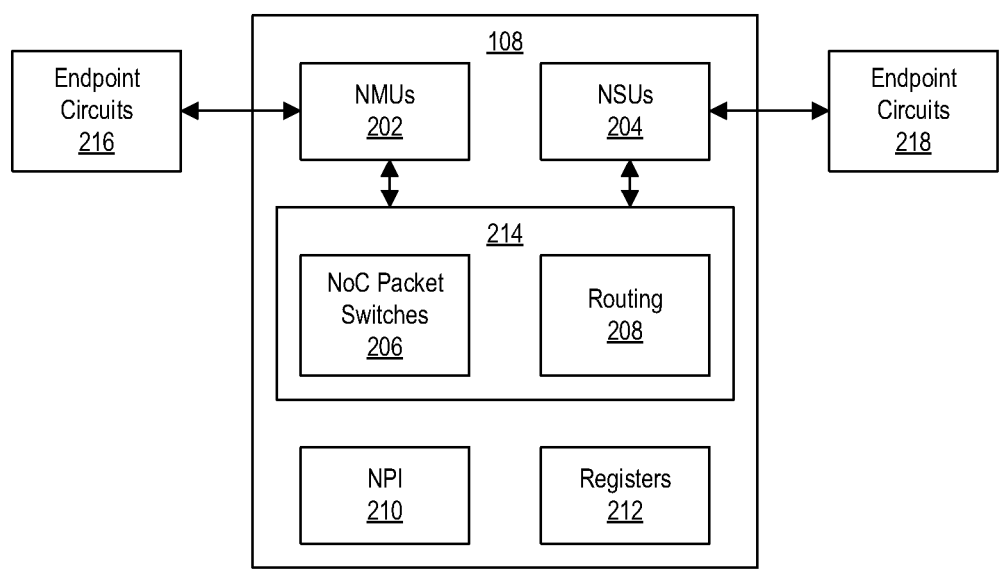
FIG. 2 illustrates an example implementation of the Network-on-Chip (NoC) of FIG. 1.

FIG. 2 illustrates an example implementation of NoC 108. NoC 108 includes NoC master units (NMUs) 202, NoC slave units (NSUs) 204, a network 214, NoC peripheral interconnect (NPI) 210, and registers 212. Each NMU 202 is an ingress circuit that connects an endpoint circuit to the NoC 108. Each NSU 204 is an egress circuit that connects the NoC 108 to an endpoint circuit. The NMUs 202 are connected to the NSUs 204 through network 214. In an example, network 214 includes NoC packet switches 206 (NPSs) and routing 208 between NPSs 206. Each NPS 206 performs switching of NoC packets. NPSs 206 are connected to each other and to NMUs 202 and NSUs 204 through routing 208 to implement a plurality of physical channels. NPSs 206 also support multiple virtual channels per physical channel.

NPI 210 includes circuitry to program NMUs 202, NSUs 204, and NPSs 206. For example, NMUs 202, NSUs 204, and NPSs 206 can include registers 212 that determine functionality thereof. NPI 210 includes a peripheral interconnect coupled to registers 212 for programming thereof to set functionality. Registers 212 in NoC 108 support interrupts, Quality of Service (QoS), error handling and reporting, transaction control, power management, and address mapping control. Registers 212 can be initialized in a usable state before being reprogrammed, such as by writing to registers 212 by PMC 110 using write requests. Configuration data for NoC 108 can be stored in a non-volatile memory (NVM), e.g., as part of a programming device image (PDI), and provided to NPI 210 for programming NoC 108 and/or other endpoint circuits.

NMUs 202 are traffic ingress points. NSUs 204 are traffic egress points. Endpoint circuits coupled to NMUs 202 and NSUs 204 can be hardened circuits (e.g., hardwired circuit blocks 112), circuits implemented in PL 104, and/or circuitry in DPE array 102. A given endpoint circuit can be coupled to more than one NMU 202 or more than one NSU 204.

In the example, endpoint circuits 216 are connected to endpoint circuits 218 through NoC 108. Endpoint circuits 216 are master circuits, which are coupled to NMUs 202 of NoC 108. Endpoint circuits 218 are slave circuits coupled to NSUs 204 of NoC 108. Each endpoint circuit 216 and 218 can be a circuit in PS 106, a circuit in PL 104, or a circuit in another subsystem (e.g., hardwired circuit blocks 112 and/or in DPE array 102).

Network 214 includes a plurality of physical channels. The physical channels are implemented by programming NoC 108. Each physical channel includes one or more NPSs 206 and associated routing 208. An NMU 202 connects with an NSU 204 through at least one physical channel. A physical channel can also have one or more virtual channels.

Connections through network 214 use a master-slave arrangement. In an example, the most basic connection over network 214 includes a single master connected to a single slave. However, in other examples, more complex structures can be implemented.

As shown in the example of FIG. 1, NoC 108 may include one or more vertical portions referred to as vertical NoCs or "VNoCs" and one or more horizontal portions referred to as "HNoCs". Each VNoC is disposed between regions of PL 104. The HNoCs are generally disposed between the regions of PL 104 and hardwired circuit blocks 112 or between the regions of PL 104 and DPE array 102. NoC 108 may be connected to memory interfaces (e.g., other hardwired circuit blocks 112). PS 106 may be coupled to the HNoC.

In one example, PS 106 includes a plurality of NMUs 202 coupled to the HNoC. The VNoC includes both NMUs 202 and NSUs 204, which are disposed in PL 104. Certain hardwired circuit blocks 112, e.g., memory interfaces, include NSUs 204 coupled to the HNoC. Both the HNoC and the VNoC include NPSs 206 connected by routing 208. In the VNoC, routing 208 extends vertically. In the HNoC, the routing 208 extends horizontally. In each VNoC, each NMU 202 is coupled to an NPS 206. Likewise, each NSU 204 is coupled to an NPS 206. NPSs 206 are coupled to each other to form a matrix of switches. Some NPSs 206 in each VNoC are coupled to other NPSs 206 in the HNoC.

NoC 108 may be programmed and/or used as part of a larger boot or programming process or programmed independently of other subsystems in SoC 100. In general, programming NoC 108 may include PMC 110 receiving NoC programming data at boot time. The NoC programming data may be a part of a PDI. PMC 110 is responsible for managing SoC 100. PMC 110 is capable of maintaining a safe and secure environment, booting SoC 100, and managing SoC 100 during normal operation.

PMC 110 loads the NoC programming data to registers 212 through NPI 210 to create physical channels. In an example, the programming data can also include information for configuring routing tables in NPSs 206. PMC 110 further boots SoC 100. In this manner, NoC 108 includes at least configuration information for the physical channels between NMUs 202 and NSUs 204. Remaining configuration information for NoC 108 can be received during runtime, as described further below. In another example, all or a portion of the configuration information described below as being received during runtime can be received at boot time.

In terms of runtime, PMC 110 is capable of receiving NoC programming data during runtime. PMC 110 loads the programming data to registers 212 through the NPI 210. In an example, PMC 110 configures routing tables in NPSs 206. PMC 110 configures QoS paths over the physical channels. PMC 110 configures address space mappings. PMC 110 configures ingress/egress interface protocol, width, and frequency.

Figure 3:
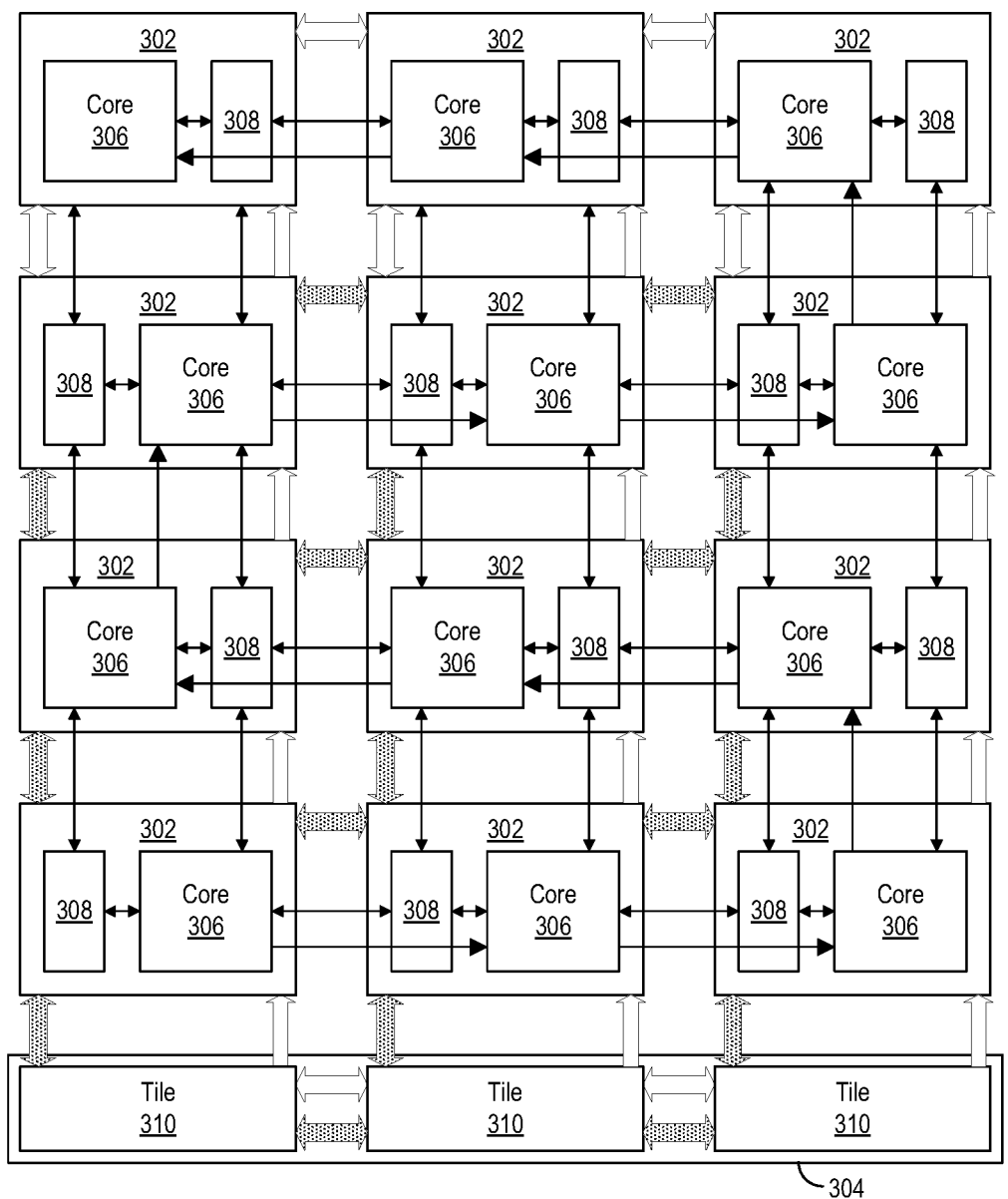
FIG. 3 illustrates an example implementation of the Data Processing Engine (DPE) array of FIG. 1.

FIG. 3 illustrates an example implementation of DPE array 102. In the example of FIG. 3, DPE array 102 is implemented as a two-dimensional array of DPEs 302 that includes an SoC interface block 304. DPEs 302 and SoC interface block 304 are hardwired and programmable. DPE array 102 may be implemented using any of a variety of different architectures. For purposes of illustration and not limitation, FIG. 3 illustrates DPEs 302 arranged in aligned rows and aligned columns. In the example, DPEs 302 are arranged where DPEs in selected rows are horizontally inverted or flipped relative to DPEs in adjacent rows. In one or more other embodiments, rows and/or columns of DPEs 302 may be offset relative to adjacent rows and/or columns. In the example, each DPE 302 includes a core 306 and a memory module 308. Each core 306 is capable of accessing data from an adjacent memory module whether in the same DPE 302 or in another DPE 302. The number of DPEs 302, particular arrangement of DPEs 302, and/or orientation of DPEs 302 is not intended to be limiting.

DPEs 302 are interconnected by a DPE interconnect network. The DPE interconnect network includes core-to-memory interface connections, core-to-core cascade connections, streaming connections, and memory mapped connections. The DPE interconnect network may also include an independent debug network and/or an independent event broadcast network (neither of which are not shown).

SoC interface block 304, which is also hardwired and programmable, is capable of coupling DPEs 302 to one or more other subsystems of SoC 100. In one or more embodiments, SoC interface block 304 is coupled to adjacent DPEs 302. For example, SoC interface block 304 may be directly coupled to each DPE 302 in the bottom row of DPEs in DPE array 102. SoC interface block 304 is capable of communicating with any DPE 302 of DPE array 102 by communicating with one or more selected DPEs 302 of DPE array 102 directly connected to SoC interface block 304 and utilizing the DPE interconnect network formed of various configurable switches (not shown) included in each respective DPE 302. SoC interface block 304 is capable of coupling each DPE 302 within DPE array 102 with one or more other subsystems of SoC 100. For example, SoC interface block 304 is capable of coupling DPE array 102 to NoC 108 and to PL 104. As such, DPE array 102 (e.g., selected DPEs 302) is capable of communicating with circuit blocks implemented in PL 104, PS 106, and/or any of the hardwired circuit blocks 112.

Cores 306 provide the data processing capabilities of DPEs 302. Each core 306 may be implemented as any of a variety of different processing circuits. In an example implementation, each core 306 is implemented as a processor that is capable of executing program code, e.g., computer readable instructions. In that case, each core 306 may include a program memory that may only be accessed by the particular core in which the program memory is disposed. The program memory in each core 306 is capable of storing instructions that are executed by the respective core 306. Core 306, for example, may be implemented as a CPU, a GPU, a DSP, a vector processor, or other type of processor that is capable of executing instructions. Core 306 may be implemented using any of the various CPU and/or processor architectures described herein. In another example, core 306 is implemented as a very long instruction word (VLIW) vector processor or DSP.

Cores 306 and memory modules 308 may be controlled by way of configuration data loaded into registers in the respective DPEs 302. For example, each core 306 and/or memory 308 may be activated and/or deactivated based upon configuration data loaded into the registers. The registers and memory modules 308 are addressable (e.g., may be read and/or written) via the memory mapped connections of the DPE interconnect network by certain masters in SoC 100. For example, PMC 110 is capable of reading and/or writing to any memory within DPE array 102 that is addressable using the memory mapped connections of the DPE interconnect network.

In one or more embodiments, memory modules 308 are capable of storing data that is used by and/or generated by any adjacent core 306. For example, memory modules 308 may include read/write memories such as a random-access memory (RAM). Accordingly, memory modules 308 are capable of storing data that may be read and consumed by cores 306. Memory modules 308 are also capable of storing data (e.g., results) that are written by cores 306. Each memory module 308 may be directly read or written by the core 306 that is immediately adjacent in the up, down, left, and right directions (e.g., the four cardinal directions). Thus, unless a core 306 is within a DPE 302 on an edge column or edge row, the core 306 is capable of directly accessing the memory module 308 within the same DPE 302 and the memory module of three other neighboring and adjacent DPEs 302—the DPEs 302 having a memory module 308 immediately adjacent to the core 306. The direct memory accesses are performed by way of the core-to-memory interface connections. Each core 306 is capable of viewing the memory modules 308 that the core is capable of accessing (e.g., four memory modules composed of the memory module within the same DPE and the memory modules of three other DPEs) as a single, contiguous memory (e.g., as a single address space). This allows DPEs 302 (e.g., the cores 306) to also communicate via shared memories.

DPE array 102 may be programmed by loading configuration data into registers (not shown) within each DPE 302 that define connectivity among DPEs 302 and SoC interface block 304 and how DPEs 302 and SoC interface block 304 operate. For example, for a particular DPE 302 or group of DPEs 302 to communicate with a subsystem, the DPE(s) 302 and SoC interface block 304 are programmed to do so. Similarly, for one or more particular DPEs 302 to communicate with one or more other DPEs 302, the DPEs are programmed to do so. The configuration data indicates whether the DPEs 302 communicate via stream connections or using core-to-core cascade connections.

In the example of FIG. 3, streaming connections, core-to-core cascade connections (direct core-to-core connections), and core-to-memory interface connections facilitate the exchange of application data among DPEs 302. The memory mapped connections facilitate the exchange of configuration data, control data, debugging data, and the like.

The streaming connections may be implemented by including one or more stream switches in each DPE 302. The stream switches are interconnected. For example, each stream switch may include ports that connect to the other DPEs 302 in the four cardinal directions and include ports that connect to circuit structures in the same DPE 302 (e.g., the core 306, the memory module 308 via one or more direct memory access circuits, and a memory mapped switch in the same DPE 302). The streaming connections allow neighboring DPEs 302 and non-neighboring DPEs 302 to communicate. In general, the stream switches may be programmed to operate as a circuit-switching stream interconnect or a packet-switched stream interconnect. A circuit-switching stream interconnect is capable of implementing point-to-point, dedicated streams that are suitable for high-bandwidth communication among DPEs 302. A packet-switching stream interconnect allows streams to be shared to time-multiplex multiple logical streams onto one physical stream for medium bandwidth communication. Operation of the stream switches may be controlled by writing to the previously described registers via the memory mapped connection (e.g., created using the memory mapped switches).

The memory mapped connections may be implemented by including one or more memory mapped switches in each DPE 302. Each memory mapped switch may include a plurality of memory mapped interfaces. For example, each memory mapped switch in a DPE 302 may include interfaces for connecting to the memory mapped switch in the DPE 302 above and the memory mapped switch in the DPE 302 below (or the tile 310 below) and interfaces for connecting to circuit structures in the same DPE 302 such as the core 306 including the program memory, memory module 308, and the stream switch (for configuration thereof). The memory mapped connections are used to convey configuration, control, and debugging data for DPE array 102.

DPE array 102 may be mapped to the address space of a processor system such as PS 106 or PMC 110. Accordingly, any configuration registers and/or memories within a DPE 302 or within SoC interface block 304 may be accessed via a memory mapped interface. For example, memory in memory module 308, program memory, and registers may be read and/or written via memory mapped connections. Thus, using the memory mapped connections, program code may be written to cores 306, DPEs 302, data may be read or written to memory modules 308, streaming connections between DPEs 302 may be established, etc.

Cores 306 are further capable of communicating directly with adjacent cores 306 via core-to-core cascade connections. Core-to-core cascade connections are unidirectional or bidirectional direct connections between cores as pictured in FIG. 3. Each core 306, for example, may include a cascade interface connected to an adjacent core as illustrated. The cascade interface may be connected to an internal accumulation register of the core 306 so that internal data within core 306 loaded into the accumulation register may be sent (e.g., streamed) to another adjacent core 306. Core-to-core cascade connections may be programmed based upon configuration data loaded into the registers of the DPEs 302. For example, based upon configuration data loaded into the registers, input cascade interfaces and output cascade interfaces for each core may be activated or deactivated independently and on a per-core basis.

In an example implementation, DPEs 302 do not include cache memories. By omitting cache memories, DPE array 102 is capable of achieving predictable, e.g., deterministic, performance. Further, significant processing overhead is avoided since maintaining coherency among cache memories located in different DPEs is not required. In a further example, cores 306 of DPEs 302 do not have input interrupts. Thus, cores 306 of DPEs 302 are capable of operating uninterrupted. Omitting input interrupts to cores 306 of DPEs 302 also allows DPE array 102 to achieve predictable, e.g., deterministic, performance.

SoC interface block 304 includes a plurality of interconnected tiles 310 organized in a row. In particular embodiments, different architectures may be used to implement tiles within SoC interface block 304 where each different tile architecture supports communication with a different type of subsystem or combination of subsystems of SoC 100. Tiles 310 are coupled so that data may be propagated from one tile to another bi-directionally. Each tile 310 is capable of operating as an interface for the column of DPEs 302 above.

For example, each tile 310 is capable of receiving data from another source such as PS 106, PL 104, and/or another hardwired circuit block 112, e.g., an application-specific IC or "ASIC" block. Tile 310 is capable of providing those portions of the data addressed to DPEs in the column above to such DPEs 302 while sending data addressed to DPEs in other columns on to other tiles 310 so that such tiles may route the data addressed to DPEs 302 in their columns accordingly. In this manner, data may propagate from tile to tile of SoC interface block 304 until reaching the tile that operates as an interface for the DPEs to which the data is addressed (e.g., the "target DPE(s)"). The tile that operates as an interface for the target DPE(s) is capable of directing the data to the target DPE(s) using the memory mapped switches of the DPEs (e.g., for configuration) and/or the stream switches of the DPEs (e.g., for application data).

In one aspect, SoC interface block 304 includes two different types of tiles 310. A first type of tile 310 has an architecture configured to serve as an interface between DPEs 302 and only PL 104. A second type of tile 310 has an architecture configured to serve as an interface between DPEs 302 and NoC 108 and between DPEs and PL 104. SoC interface block 304 may include a combination of tiles of the first and second types or tiles of only the second type.

The first type of tile 310 may include a stream switch connected to a PL interface and to a DPE 302 immediately above. The PL interface connects to Boundary Logic Interface (BLI) circuits located in PL 104. The second type of tile 310 includes a stream switch connected to a NoC and PL interface and to a DPE 302 immediately above. The NoC and PL interface connects to BLI circuits in PL 104 and also to one or more NMUs 202 and one or more NSUs 204 of NoC 108.

Tiles 310 include stream switches and memory mapped switches. Stream switches in adjacent tiles 310 are connected. Memory mapped switches in adjacent tiles 310 are connected. As discussed, stream switches establish streaming connections that convey application data while memory mapped switches establish memory mapped connections that convey configuration, control, and/or debug data. Regarding DPE array 102, application data is data that is operated on by cores 306. Configuration data is data used to program components of DPEs 302 such as stream switches, cores 306, and may include program code for cores 306. Stream switches in each tile 310 are connected to the stream switch in the DPE 302 immediately above. Similarly, memory mapped switches in each tile 310 are connected to the memory mapped switch in the DPE immediately above.

DPE array 102 may be programmed initially as part of a boot process for SoC 100. During runtime, DPE array 102 may be reconfigured. Thus, PMC 110 is capable of initially configuring DPE array 102 to establish which of DPEs 302 are connected to one another and/or to other subsystems or circuits, implement kernels in DPEs 302, to load program code, and the like. At any point during runtime, PMC 110 may reconfigure all or a portion of DPE array 102 by establishing different connections between DPEs 302 and/or with different subsystems or circuits, implement different kernels in DPEs 302, to load different program code, and the like.

DPE array 102 is also capable of generating various events. Events generated by DPE array 102 may be routed globally to other subsystems of SoC 100. For example, selected events generated by DPE array 102 may be routed to PMC 110 to indicate a detected error within DPE array 102. In another example, selected events may be routed to PMC 110 and/or PS 106 and serviced as interrupts.

Figure 4:
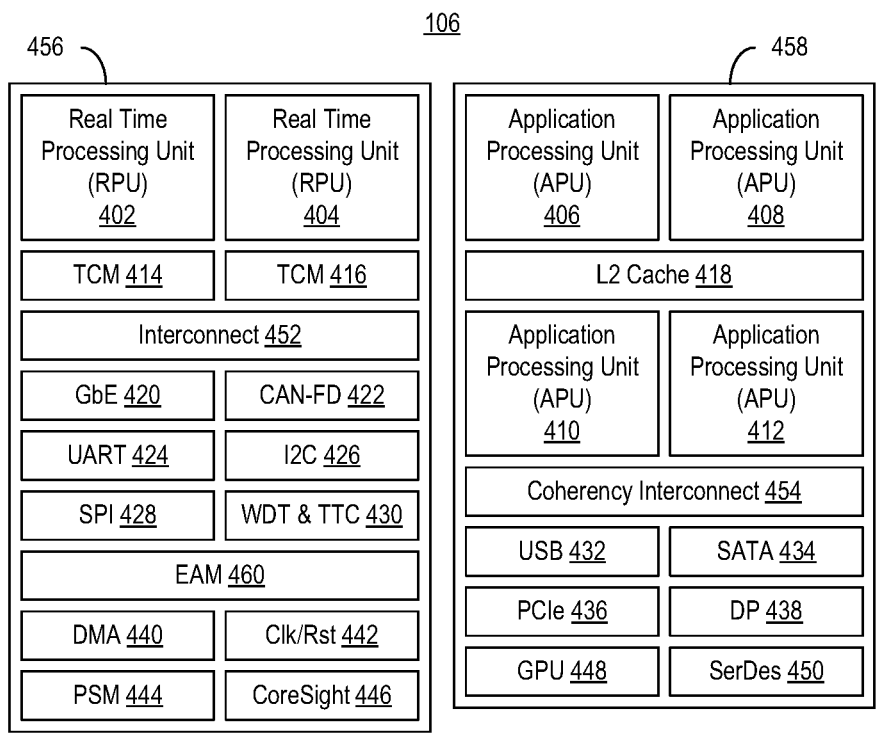
FIG. 4 illustrates an example implementation of the processor system of FIG. 1.

FIG. 4 illustrates an example implementation of PS 106 of FIG. 1. PS 106 is implemented as a hard-wired subsystem. In the example, PS 106 includes a plurality of processors capable of executing program code and a plurality of peripherals. In one aspect, PS 106 includes two separate power domains 456 and 458. Each power domain may be powered by a different power supply. As such, power domains 456 and 458 are powered by different power supply rails within SoC 100 and may be powered on or off (or placed in a lower power or hibernate mode) independently of the other power domain under control of PMC 110. For example, power domain 456 may continue to operate using real time processing units (RPUs) while power domain 458, including application processing units (APUs), is powered off. Other power domains that may be included in SoC 100 may be PL 104 operating as an independent power domain, DPE array 102 operating as another independent power domain, and NoC 108 operating as yet another independent power domain.

Power domain 456 includes RPUs 402 and 404. RPUs 402 and 404 may each include a level-1 (L1) cache (not shown) and a tightly coupled memory (TCM) interface 414, 416 where, for example, TCM 414 corresponds to RPU 402 and TCM 416 corresponds to RPU 404. In the example of FIG. 4, power domain 456 includes a variety of peripherals that allow external devices to communicate with PS 106 over various industry standard protocols. For example, power domain 456 includes one or more gigabit Ethernet controllers (GbE) 420, one or more Controller Area Network (CAN) and/or CAN-Flexible Data Rate (CAN-FD) controllers 422, one or more Universal Asynchronous Receiver-Transmitter controllers (424), one or more I2C controllers 426, Serial Peripheral Interfaces (SPIs) 428, and/or Watchdog Timer and Triple Timer Counter (TTC) 430. Power domain 456 may include additional circuit blocks such as direct memory access engine (DMA) 440, Clock and Reset circuitry (Clk/Rst) 442, PS (processing system) manager 444, CoreSight™ controller 446, and/or interconnect 452. CoreSight™ controller 446 is a hardwired core or Intellectual Property (IP) configured to provide debug and/or trace capabilities for PS 106 (e.g., any of the processors contained therein).

In the example of FIG. 4, PS 106 may include an error aggregation module (EAM) 460. EAM 460 is capable of receiving and aggregating errors from other programmable resources (e.g., subsystems) within SoC 100. In one aspect, EAM 460 is capable of aggregating the received errors, generating a summary error event, and providing the summary error event to PMC 110. EAM 460 may be programmed, for example, by PMC 110 to generate certain summary error events, e.g., interrupts, to PMC 110 in response to particular received errors and/or combinations of errors. PMC 110 is capable of servicing errors in response to events generated by EAM 460. In another aspect, processors of PS 106 (e.g., RPU 402, RPU 404, APU 406, APU 408) are capable of interrupting each other and/or PMC 110 through interrupt circuitry (not shown) referred to as an Inter-Processor Interrupt mechanism (IPI) that may be utilized for purposes of error management and that may be coupled to EAM 460.

Power domain 458 includes APUs 406, 408, 410, and 412. Each of APUs 406, 408, 410, and 412 may include an L1 cache (not shown). Further, APUs 406, 408, 410, and 412 may share a level-2 (L2) cache 418. Power domain 458 includes a variety of peripherals that allow external devices to communicate with PS 106 over various industry standard protocols. For example, power domain 458 may include peripherals such as one or more Universal Serial Bus (USB) controllers 432, one or more Serial AT Attachment (SATA) controllers 434, one or more Peripheral Component Interconnect Express (PCIe) controllers 436, one or more Display Port (DP) controllers 438. Power domain 458 may include one or more GPUs 448, Serializer/Deserializer (SerDes) circuitry 450, and/or a coherency interconnect 454. Interconnects 452 and 454 are capable of establishing connectivity between the respective circuit blocks illustrated in FIG. 4.

FIG. 4 is provided for purposes of illustration and not limitation. PS 106 may include other circuit blocks not illustrated in FIG. 4. Examples of such circuit blocks include, but are not limited to, one or more interrupt request units (IRQs) and snoop control units (SCUs).

In another aspect, PCIe 436 may be included in another subsystem called a Coherent PCIe Module or "CPM." The CPM may be implemented external to PS 106. In one aspect, the CPM includes one or more PCIe endpoints. The CPM may also include interfaces that directly connect the PCIe endpoints therein with gigabit transceivers (GTs) of SoC 100, PL 104, and/or PS 106.

Figure 5:
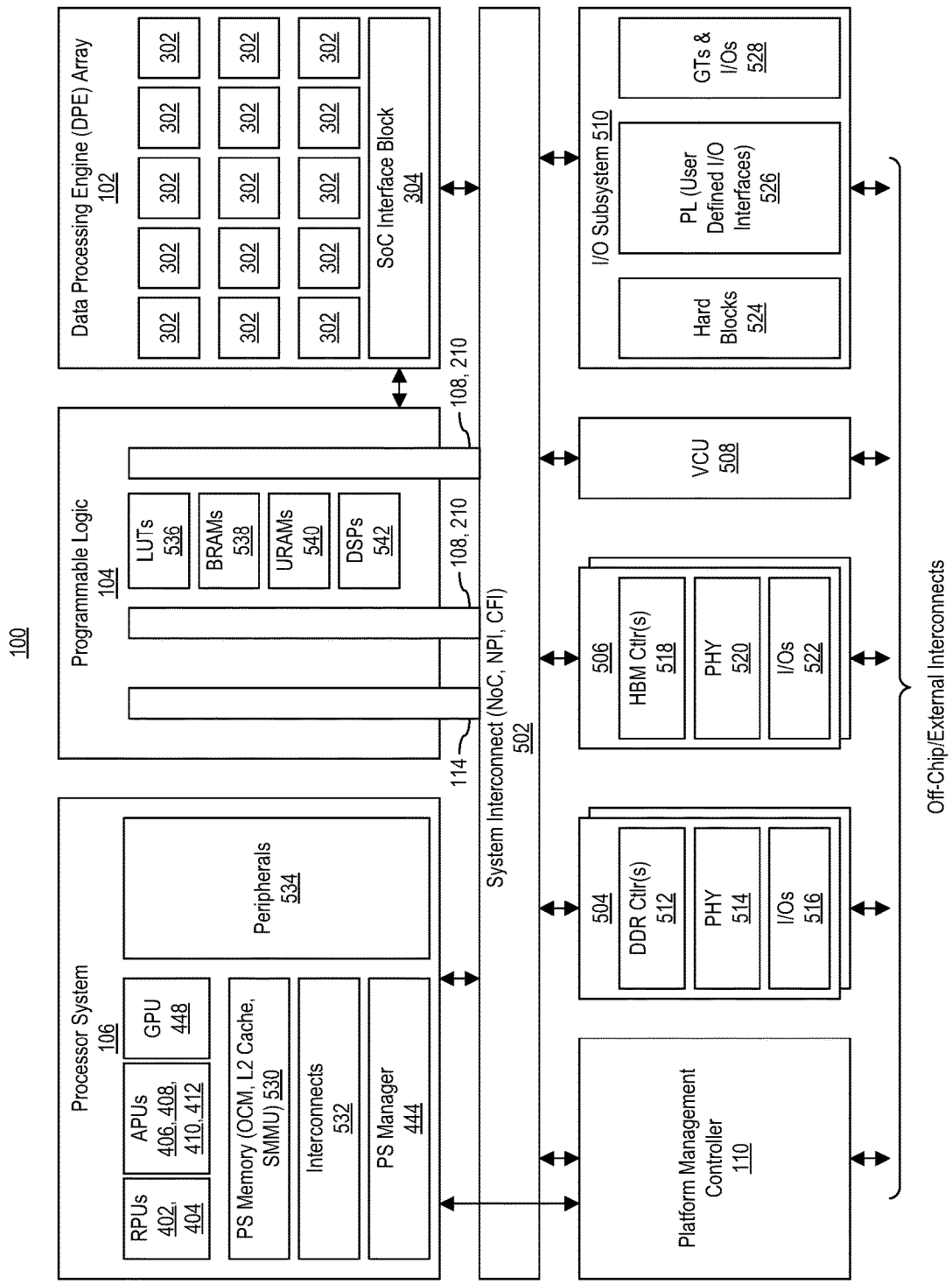
FIG. 5 illustrates another example implementation of the SoC of FIG. 1.

FIG. 5 illustrates another example implementation of SoC 100 of FIG. 1. FIG. 5 illustrates a logical view of the various components and/or subsystems of SoC 100. In the example of FIG. 5, SoC 100 includes DPE array 102, PL 104, PS 106, and a system interconnect 502. System interconnect 502, for purposes of illustration, includes NoC 108, CFI 114, and NPI 210. SoC 100 further includes PMC 110, one or more memory interfaces 504, 506 (e.g., hardwired circuit blocks), a video codec unit (VCU) 508 (e.g., hardwired circuit block), and an I/O subsystem 510.

In the example of FIG. 5, each of the subsystems shown is connected to the system interconnect 502. For example, DPE array 102, PL 104, PS 106, PMC 110, memory interfaces 504, 506, VCU 508, and/or I/O subsystem 510 are connected to system interconnect 502. In one aspect, PMC 110 is capable of programming (e.g., configuring) DPE array 102, PL 104, PS 106, memory interfaces 504 and 506, VCU 508, and I/O subsystem 510 through system interconnect 502.

PMC 110 operates as the Root-of-Trust for SoC 100. In one aspect, PMC 110 includes one or more processors capable of executing program code. PMC 110 may include additional resources such as control circuitry, memory, and one or more interfaces. PMC 110 is capable of performing various security and safety functions within SoC 100. For example, PMC 110 is capable of booting SoC 100, configuring DPE array 102, configuring PL 104, configuring PS 106, configuring NoC 108, and/or performing partial reconfiguration of the various subsystems of SoC 100 by way of system interconnect 502. For instance, in reference to NoC 108, PMC 110 is capable of initially configuring NoC 108 and, once initially configuring NoC 108, configuring DPE array 102 by way of the data paths formed in NoC 108 from the initial configuration. PMC 110 is capable of writing to control registers for setting various functions and configurations for SoC 100 on a chip-wide basis.

Memory interface 504 includes one or more configurable DDR controllers 512, a Physical Interface (PHY) 514, and configurable I/Os 516. Memory interface 506 includes one or more configurable High Bandwidth Memory (HBM) controllers 518, a Physical Interface (PHY) 520, and configurable I/Os 522. VCU 508 is connected to system interconnect 502 and is capable of performing a variety of different video encoding, decoding, and/or processing operations.

I/O subsystem 510 may include one or more additional hard blocks 524, one or more user defined I/O interfaces 526 implemented using PL 104, and GTs and I/Os 528. Examples of such additional hard blocks may include, but are not limited to, a configurable forward error correcting block, a configurable cryptographic block, and a configurable analog mixed signal block (e.g., including one or more configurable DACs and/or ADCs). It should be appreciated that SoC 100 may include fewer or more hardwired circuit blocks than illustrated in FIG. 5.

For purposes of illustration, a simplified version of PS 106 is illustrated in FIG. 5. In the example of FIG. 5, no power domains are illustrated in PS 106. PS 106 includes one or more RPUs 402, 404, one or more APUs 406, 408, 410, 412, and one or more GPUs 448. PS 106 further may include a PS memory 530 that may represent a level 2 cache, an on-chip memory (OCM) and a system memory management unit (SMMU). PS 106 further can include one or more interconnects 532, and one or more peripherals 534. Interconnects 532 may include a coherent interconnect and a Snoop Control Unit (SCU) that enable other masters to read and/or write to the level 2 cache memory and/or OCM. For example, RPUs 402, 404 and master circuit blocks in PL 104 are able to snoop the level 2 cache memory. Peripherals 534 may include one or more different I/O controllers as previously described. PS manager 444 is capable of controlling operation of components within PS 106 including, for example, the powering on or off of the power domains therein. In one aspect, PS manager 444 is capable of performing operations in response to instructions from PMC 110. In the example of FIG. 5, PMC 110 is capable of communicating with PS 106 via system interconnect 502. PMC 110 further may be directly connected to PS 106 via a separate or distinct and direct connection.

PL 104, as previously described, can include LookupTables (LUTs) 536, BRAMs 538, Ultra RAMs (URAMs) 540, and DSPs 542 interconnected by a fabric interconnect. PL 104 are connected to system interconnect 502 and to the fabric interconnect. DPE array 102 may include a plurality of hardwired and programmable DPEs 302 that are interconnected. DPEs 302 connect to system interconnect 502 and to the fabric interconnect through SoC interface block 304.

In the example of FIG. 5, NoC 108 may also be connected or coupled to another NoC located in another die and/or IC. For example, in the case where SoC 100 is formed of a plurality of dies interconnected by way of an interposer or other carrier, NoC 108 can be coupled through the interposer or carrier with the NoC in other ones of the dies.

Figure 6:
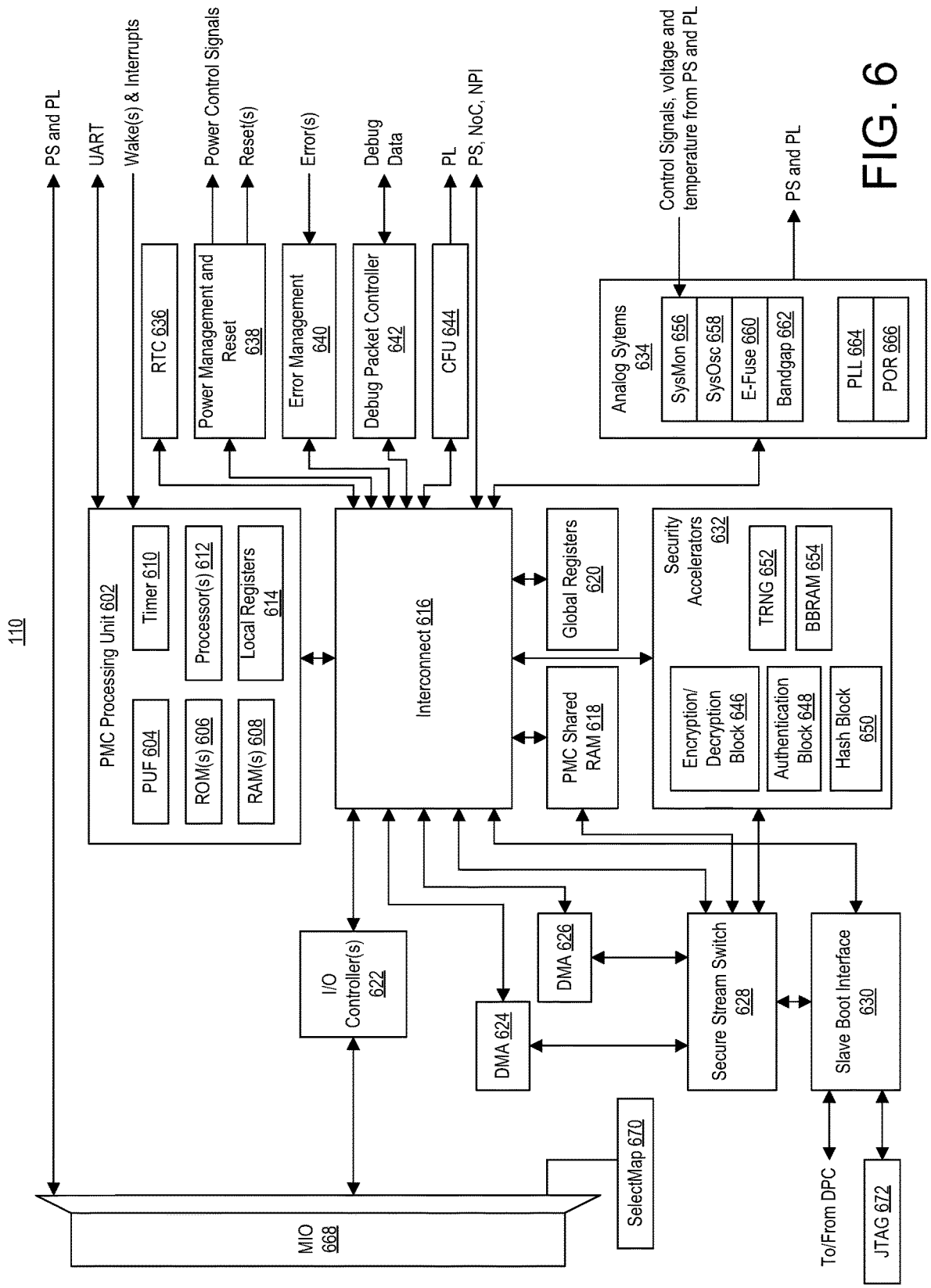
FIG. 6 illustrates an example implementation of a Platform Management Controller (PMC).

FIG. 6 illustrates an example implementation of PMC 110. PMC 110 is a hardwired circuit block on SoC 100. In the example of FIG. 6, PMC 110 includes PMC processing unit 602 (being separate and distinct from PS 106). PMC processing unit 602 can include a physically unclonable function (PUF) 604, one or more ROMs 606, one or more RAM(s) 608, one or more timer(s) 610, one or more processors 612, and local registers 614. In an example implementation, PMC 110 is a separate power domain (e.g., has a separate and independent power source) that is independent of PL 104, DPE array 102, and/or PS 106.

In an aspect, processors 612 in PMC processing unit 602 are capable of operating in lockstep using appropriate voting circuitry. In another aspect, a first subset of processors 612, which may operate in lockstep, are dedicated to accessing (e.g., executing code stored in) ROM(s) 606; and, a second subset of processors 612, which may operate in lockstep, are dedicated to accessing (e.g., executing code stored in) RAM (s) 608. The first subset of processors 612 may be mutually exclusive of the second subset of processors 612.

For example, one or more processors 612 are dedicated to executing code stored in ROMs 606. The ROM dedicated processor(s) 612, corresponding to the first subset of processors 612, are the first processors of SoC 100 that are active out of reset during boot of SoC 100. The ROM dedicated processor(s) 612, in executing code stored in ROM(s) 606, are capable of performing operations such as device initialization, boot interface validation, release of further processors 612 of PMC 110 from reset, and loading a PMC platform loader and manager into RAM(s) 608. ROM dedicated processor(s) 612 are also capable of performing secure boot, post-boot security monitoring, and PUF management. RAM dedicated processor(s) 612, corresponding to the second subset of processors 612, are capable of executing code stored in RAM(s) 608 once released from reset.

ROM(s) 606 and RAM(s) 608 are accessible only by processor(s) 612. In another aspect, each processor 612 has a ROM 606 and a RAM 608 so that each processor 612 has an independent and dedicated ROM 606 and an independent and dedicated RAM 608. RAM 608 may be protected with error correction coding (ECC) circuitry. Processors 612 may be used to power up and configure SoC 100 by executing code stored in ROM(s) 606 and executing firmware loaded from a main boot device into RAM(s) 608 by way of executing the code stored in ROM(s) 606. Local registers 614 are configuration registers for PMC processing unit 602 and may only be accessed by PMC processing unit 602.

One aspect of having PMC 110 operate as the Root-of-Trust of SoC 100 is using the code stored in ROM(s) 606 to load firmware into RAM(s) 608. ROM dedicated processor (s) 612, in executing the code from ROM(s) 606, are capable of authenticating any firmware loaded into SoC 100 to be executed by RAM dedicated processor(s) 612 and/or authenticating any PDIs loaded into SoC 100 prior to execution and/or use of such firmware or images by subsystems of SoC 100 other than PMC 110. Accordingly, any PDI that is used to configure and/or program any portion of SoC 100 may first be authenticated by PMC 110.

In another aspect, PMC 110 is capable of performing operations such as zeroizing the particular subsystem or portions of SoC 100 that PMC 110 is configuring. As such, PMC 110, as part of configuring, is capable of erasing any and/or all prior data stored in the portions of SoC 100 being reconfigured. For example, the ROM dedicated processor(s) may zeroize PMC components and/or the boot device from which data is loaded into SoC 100 (e.g., the platform loader and manager or "PLM") in response to certain conditions or events. The RAM dedicated processor(s) may zeroize other resources within SoC 100 outside of PMC 110 through execution of firmware in response to certain conditions or events.

Post boot, processor(s) 612 are capable of performing a variety of different functions using the various components contained in PMC 110. For example, processors 612 are capable of performing power-management, voltage and temperature monitoring, safety and security event response, and the like for SoC 100. As pictured, PMC processing unit 602, e.g., processors 612, are capable of receiving interrupt and wake signals, which may include signals originating from external to SoC 100 and/or signals originating from within SoC 100, indicating particular power domains and/or islands to be powered on and/or down for these purposes.

PMC processing unit 602 is connected to interconnect 616. PMC processing unit 602 is capable of communicating with other components within PMC 110 and SoC 100 by way of interconnect 616. Interconnect 616 may include a plurality of memory mapped switches and interfaces and a plurality of stream switches and interfaces. Interconnect 616 is connected to PMC shared RAM 618, global registers 620, I/O controller(s) 622, DMAs 624 and 626, secure stream switch 628, slave boot interface (SBI) 630, security accelerators 632, analog systems 634, Real-time Clock (RTC) 636, power management and reset 638, error management circuitry 640, debug packet controller 642, and Configuration Frame Unit (CFU) 644.

PMC shared RAM 618 may be used to store configuration data (e.g., a PDI) and/or other data for SoC 100 during processing and as general-purpose data-processing RAM for PMC 110. Global registers 620 are configuration registers that are accessible by any (e.g., all) masters in PMC 110. Global registers 620 may include general-purpose, power control, error management registers, and a service interrupt request interface. I/O controller(s) 622 may include one or more I/Os coupled to a multiplexed input/output (MIO) 668. As shown, MIO 668 further connects to SelectMap 670, PS 106, and PL 104. MIO 668 is capable of selectively connecting I/O signals to SelectMap 670, PS 106, PL 104, and/or to I/O controllers 622. Examples of I/O controllers 622 include, but are not limited to, I2C and one or more flash interfaces such as SPI and/or SD/eMMC (secure digital embedded MultiMediaCard) and a USB interface.

MIO 668 provides connectivity to I/O pins of SoC 100 that are capable of serving multiple different functions depending on configuration. For example, MIO 668 may be configured to connect signals to SelectMap 670 for configuration or to I/O controllers 622 such as a flash memory controller and/or a USB interface.

DMAs 624 and 626 are used for transferring data within the PMC 110 for configuration of SoC 100 and processing of the configuration data. Secure stream switch 628 ensures that data streams provided to security accelerators 632 for processing are secure. SBI 630 facilitates slave boot and/or configuration in multi-die SoC configurations. Though not shown, SBI 630 may be connected to SelectMap 670 and NoC 108.

Security accelerators 632 can include an encryption/decryption block 646 capable of performing encryption and/or decryption, an authentication block 648 capable of performing authentication, and a hash block 650 capable of generating hashes on received data. In one example, encryption/decryption block 646 is a symmetric key cryptography engine capable of performing Advanced Encryption Standard (AES) using Galois Counter Mode (GCM) (AES-GCM). In an example, authentication block 648 is capable of performing public-key cryptography. For example, authentication block 648 is capable of implementing the Elliptic Curve Digital Signature Algorithm and/or Rivest-Shamir-Adleman. Hash block 650 is capable of performing Secure Hash Algorithm 3/394. Security accelerators 632 may also include a true random number generator (TRNG) circuit 652 capable of generating random numbers and a battery-backed RAM (BBRAM) 654 circuit block. The particular circuit blocks included in security accelerators 632 are provided for purposes of illustration and not limitation. In one aspect, only blocks 646, 648, and 650 of security accelerators 632 are accessible only via secure stream switch 628, while blocks 652 and 654 are accessible by interconnect 616.

Analog systems 634 can include a system monitor 656 capable of monitoring voltage and temperature from one or more remote system monitor circuits that may be located at various places and/or in various subsystems around SoC 100; system oscillator(s) 658 capable of generating the clock signal for PMC 110; e-fuse controller 660 capable of maintaining and/or managing e-fuse circuitry on the SoC 100; bandgap circuitry 662 capable of generating one or more reference voltages for analog devices in the SoC 100 such as DACs and/or ADCs that may be implemented on the SoC 100 as hardwired and programmable circuit blocks; one or more phase lock-loops (PLLs) 664 capable of generating clock signals for PMC 110, NoC 108, NPI 210, and PS 106; and a Power-On-Reset (POR) circuit 666.

POR circuit 666 is capable of sensing voltages within SoC 100 and signaling (e.g., releasing) power on reset. In response to POR circuit 666 signaling power on reset, power management and reset 638 may include control logic that is capable of performing zeroization (e.g., writing zeros) to all memories in PMC 110 with the exception of ROM(s) 606 and in each of the other subsystems of SoC 100 for purposes of security.

E-fuse controller 660 is capable of reading the e-fuse circuitry. The e-fuse circuitry (e.g., e-fuse memory elements) may be used to store design information such as device DNA and/or security keys. The e-fuse circuitry further may control features such as disabling Joint Test Action Group (JTAG) 672.

RTC 636 is a clock circuit that is capable of operating on a highly accurate crystal oscillator. RTC 636 may be used to measure current time and generate alarms at specific times for various operating system and device management functions within SoC 100. Power management and reset circuitry 638 implements the logic and interfaces necessary to control power-islands, power domains, and resets to other circuit blocks on SoC 100. Power management and reset circuitry 638 further connects to PS 106 to control domains and islands implemented in PS 106.

Error management circuitry 640 is capable of receiving, recording, and responding to errors from other subsystems within SoC 100. For example, error management circuitry 640 is capable of capturing errors from all over SoC 100. Error management circuitry 640 may be programmed by PMC 110 to generate certain events, e.g., interrupts, in PMC 110 in response to particular received errors and/or combinations of errors. PMC 110, e.g., processors 612, is capable of servicing errors in response to events generated by error management circuitry 640.

In one aspect, error management circuitry 640 may be programmed to send a signal from SoC 100 via an I/O pin to circuitry external to SoC 100 (e.g., a circuit located on the circuit board on which SoC 100 is disposed) indicating the occurrence of an error. In another aspect, error management circuitry 640 may be programmed to trigger power on reset in response to certain errors or trigger a system reset in response to other particular errors. This functionality preserves the secure state of SoC 100. In the case of a system reset, PMC 110 is capable of resetting a particular circuit block or subsystem in SoC 100 without changing the security context that had already been programmed. In the case of a system reset, zeroization is not performed on the subsystem, which results in a faster recovery.

Debug packet controller 642 is a packet controller for a high-speed debug port (HSDP) that processes packets passed thereto from other interfaces on SoC 100 such as high-speed serial interfaces, other debugging circuitry in other subsystem(s), and/or PCIe blocks (e.g., in PS 106 or in the CPM). In one example, debug packet controller 642 is capable of operating at speeds exceeding 10 Gbps. Debug packet controller 642, for example, can be accessed by certain transceivers (high speed), JTAG 672 or PCIe 436 in PS 106. Debug packet controller further may access the debugging circuitry in PS 106 (e.g., CoreSight 446) and/or in other subsystems. Thus, PMC processing unit 602 provides centralized access to debugging data for SoC 100.

Providing centralized access to debugging data is another aspect of PMC 110 operating as the Root-of-Trust for SoC 100.

In one aspect, debug packet controller 642 has two connections to CoreSight™ controller 446. A first of the connections supports debug operations. Debug operations may include reading registers, memories, moving data from one register and/or memory to another, and/or writing data to register(s) and/or memories. These operations may be performed for any such locations accessible via debug packet controller 642 and may be performed, at least in PS 106, using CoreSight™ controller 446. A second of the connections supports trace operations. Trace operations, which entail capturing the state of a processor, processors, or processor system as program code is executed on each clock cycle, require significant bandwidth that exceeds the capabilities of JTAG 672. JTAG is a lower speed serial connection. As such, one is capable of using trace capabilities in PS 106 by high speed access to SoC 100 via debug packet controller 642 and the internal connections to CoreSight™ controller 446.

Debug packet controller 642 is capable of deciphering received packets, e.g., from a host, and executing the commands contained therein. The commands may indicate where to read or write data (e.g., a particular destination such as CoreSight™ controller 446, other debugging circuitry, interconnect 616, and/or other memory or register in a particular subsystem accessible by way of interconnect 616). In general, debug packet controller 642 is capable of reading and/or writing any memory mapped memory and/or circuit structure in SoC 100, whether in DPE array 102, PL 104, PS 106, or NoC 108.

Accordingly, in one aspect, debug packet controller 642 may be used to debug PL 104. In one example, an integrated logic analyzer may be implemented in PL 104 with a user circuit design. The integrated logic analyzer may capture signals from buses, registers, etc. of the user circuit design each clock cycle. Debug packet controller 642 may be connected to the integrated logic analyzer to receive the debug data from the integrated logic analyzer. Thus, the integrated logic analyzer can be read from the host system via debug packet controller 642 quickly as opposed to using other slower mechanisms such as boundary scan.

In another aspect, debug packet controller 642 is capable of performing a read back of flip flops in PL 104. Debug packet controller 642, for example, is capable of reading any configuration data or state data from PL 104 by way of CFU 644, for example. Debug packet controller 642 is capable of performing read back at a much faster rate than using other mechanisms such as boundary scan. Read back, unlike using an integrated logic analyzer, does not consume any resources of PL 104 that would otherwise be available for use in a user circuit design.

Debug data captured by debug packet controller 642 may be output as a packetized data stream to the host over high speed connection(s). In one aspect, debug packet controller 642 is connected to a high speed interface implemented in PS 106 (not shown in FIG. 4) that is connected to one or more GTs of SoC 100 enabling high speed connectivity to the host system. This connection requires that PS 106 be powered on and that PL 104, which includes the GTs, also be powered on. In another aspect, debug packet controller 642 is capable of accessing MIO 668 via interconnect 616.

In another example, debug packet controller 642 may be connected to the host system via JTAG 672. While JTAG 672 is a lower speed interface, such a connection does not depend on any other subsystem of SoC 100 such as PL 104 and/or PS 106. Still, while using JTAG 672, one packet provided to debug packet controller 642 may be used to initiate a plurality of operations. For example, repetition may be specified by the packet so that in response to a packet received via JTAG 672, debug packet controller 642 may perform a more complex operation such as initializing a RAM (where a plurality of operations such as writes are performed in response to the single packet). In another example, the packet may express conditionality that is implemented by debug packet controller 642.

In another example, in cases where SoC 100 is deployed and may not be accessed by physically connecting a cable for debugging (e.g., a datacenter application), debug packet controller 642 may be accessed by PCIe 436 (whether within PS 106 or implemented as a CPM as described in connection with FIG. 4). In still another example, one may connect to debug packet controller 642 via PL 104. For example, a circuit such as an Ethernet controller or USB controller may be implemented in PL 104 that may be connected to debug packet controller 642.

In another aspect, debug packet controller 642 is capable of configuring PL 104 directly via CFU 644. In another aspect, debug packet controller 642 is capable of configuring PL 104, PS 106, DPE array 102, or any other portion of SoC 100 by receiving data that debug packet controller 642 writes to SBI 630. By writing to SBI 630, an interrupt is generated to PMC processing unit 602. PMC processing unit 602 may then initiate a process for authenticating the data and then configuring SoC 100 using the received data under control of firmware executing in PMC processing unit 602.

Configuration of SoC 100 may be initiated by way of debug packet controller 642 writing to SBI 630, JTAG 672 writing to SBI 630, PCIe receiving data that is written to SBI 630, or via writing to SelectMap 670 (which uses a similar process as described in connection with SBI 630). In these examples, PMC 110 operates as a slave. In cases where PMC 110 operates as a master, PMC 110 is retrieving configuration data for SoC 100 from a particular location such as an external Flash, an external RAM, via USB, or the like.

Including debug packet controller 642 within PMC 110 provides several benefits. In one aspect, PMC 110 is always powered on thereby ensuring that debug is available despite other subsystems potentially being powered off. Some designs, for example, may not use PS 106 or PL 104. In such cases, debug functionality would still be available for SoC 100. In addition, PMC 110 is capable of providing secure access to debug packet controller 642 by selectively enabling debug packet controller 642. For example, PMC processing unit 602 may not enable debug packet controller 642 until such time that SoC 100 is operating and only in cases where the device image(s) loaded into SoC 100 (which have been authenticated) indicate that debug packet controller 642 is to be activated.

In another aspect, debug packet controller 642 may be separated from surrounding circuitry in PMC 110 by one or more security gates that operate under control of PMC processing unit 602. PMC processing unit 602 must enable the security gates, e.g., control the gates to allow signals to pass, in order to use debug packet controller 642. Otherwise, debug packet controller 642 remains isolated and not reachable.

CFU 644 is capable of performing configuration and readback of configuration data provided or loaded into configuration registers of PL 104. PMC 110, for example, transfers the PL bitstream (e.g., configuration data) through CFU 644 to configure PL 104.

SoC 100 may be implemented to include a plurality of power domains that are controlled by power management and reset circuitry 638 under control of PMC processing unit 602. The power domains may include a low power domain in PS 106 that includes the RPUs and OCM; a full power domain in PS 106 that includes the APUs and high speed I/Os; a NoC 108 and system double data rate (DDR) power domain; and a PL 104 power domain.

Other power domains may be created within the SoC 100 that can be controlled via the circuit board on which SoC 100 is disposed under control of PMC 110. These other power domains may include, but are not limited to, further I/O power domains, a battery power domain, a PMC power domain (e.g., where the PMC has its own power domain and supply), a PL RAM power domain, and a DPE array power domain.

In one aspect, SoC 100 includes multiple banks of I/Os. JTAG 672 may be connected to one bank of I/Os (not shown in FIG. 6). These I/Os may be fixed. Power on reset signals, error signals output to the circuit board on which SoC 100 is disposed, and a reference clock received by SoC 100 may also be part of that fixed set of I/Os.

Secure stream switch 628 may be used to stream configuration information, e.g., an image, into SoC 100. For example, an image (e.g., a PDI) may be pushed to SelectMap 670 via MIO 668. An image may also be received through JTAG 672. In any case, the image is pushed to SBI 630, which may generate an interrupt to PMC processing unit 602. PMC processing unit 602 is capable of setting up DMAs 624, 626 to perform data transfers. DMAs 624, 626, operating through secure stream switch 628, are capable of unloading buffers contained in SBI 630 and storing the data in PMC shared RAM 618 for further processing. PMC processing unit 602 may further push the data through CFU 644 to the CFI to configure PL 104 or another interface to configure DPE array 102 and/or PS 106.

In one aspect, secure stream switch 628 may implement crossbar functionality. For example, PMC processing unit 602 may execute firmware that configures secure stream switch 628 (e.g., connecting selected ports of secure stream switch 628). PMC processing unit 602 may also set up DMAs 624, 626 to effectuate data transfers using secure stream switch 628. As configuration data is received, DMAs 624, 626 may place such data in PMC shared RAM 618 by way of secure stream switch 628. Concurrently, DMAs 624, 626 may direct the data from PMC shared RAM 618 through secure stream switch 628 to security accelerators 632 for processing (e.g., authentication).

In another aspect, secure stream switch 628 may be configured by PMC processing unit 602 to implement broadcast functionality. In that case, data received at one port of secure stream switch 628 may be broadcast (e.g., sent concurrently) to two or more different ports of secure stream switch 628 and, as such, to two or more different destinations concurrently. In still another aspect, secure stream switch 628 may be used to perform a memory copy. DMA 624 and/or 626 may be configured to read from a particular memory location and provide the data read from the memory to secure stream switch 628. Secure stream switch 628 may be configured to output the data to another port also connected to DMA 624 and/or 626 to write the data to a particular destination memory location.

PMC 110 is capable of controlling power on and/or power down of any of the different power domains implemented in SoC 100. The powering up and/or down of any power domain may be controlled by PMC 110 in response to any of a variety of different events received by PMC 110. In this regard, PMC 110 is capable of responding to any of a variety of different events that may be interpreted, e.g., by virtue of the executed firmware, as a wake event to power on a particular power domain or domains. Examples of events interpreted as wake events may include, but are not limited to, selected interrupt(s) received by PMC 110, I/O events referring to signals received from external sources by way of I/O of SoC 100, events generated by RTC 636, wake by software, wake by any peripheral IP events, or wake by debugger.

The term "wake by software" refers to a subsystem such as the APUs being powered down. Software executing in another subsystem, e.g., in an RPU, may issue a request to PMC 110 to power up the APU subsystem. The term "wake by debugger" refers to a request specifically from the debugger, e.g., CoreSight 446 in PS 106. The request, which is a request to power up a power domain, may be initiated by way of the registers in the debugger. Subsystems such as PS 106, PMC 110, and/or CPM include debug circuitry that is part of an overall debug system within SoC 100. The debugger is capable of requesting any one or more of these subsystems to power up. The requests are generated by the debugger writing to dedicated registers that generate interrupts to PMC 110 or PS 106 to power up the requested power domain or power island. In general, the debugger may be accessed by debug software through packet controller 642.

In another example, PMC 110 may be implemented with a power mode referred to as "power down mode USB" where SoC 100 may be powered up and/or powered down via USB. For example, MIO 668 may be connected to a USB interface external to SoC 100. MIO 668 may connect the USB signals to I/O controller(s) 622. In this manner, PMC 110 may remain powered on and monitor for a wake signal received via USB. In this example, since PMC 110 is monitoring for the wake signal over USB, PS 106, which may include a USB controller where one is not included in PMC 110, is powered down. Having PMC 110 powered on allows the USB interface to remain active using I/O controllers 622 to at least monitor for a wake signal received via USB while the USB controller implemented in PS 106 is powered down. PMC 110 need not provide full USB functionality. Rather, in this example, PMC 110 need only detect a specific signal via USB, e.g., the wake signal. Because PMC 110 is on a completely different power rail than PS 106, PMC 110 is capable of detecting the wake signal via the USB interface. PMC 110, in response to receiving the wake signal, is capable of executing a wake process to power on PS 106 and/or any other subsystems of SoC 100. Further, PMC 110 is capable of restoring the USB interface to full functionality by waking the power domain and/or island of PS 106 that includes the USB controller connected to MIO 668.

In the foregoing example, USB was used for purposes of illustration. In other examples, MIO 668 may be connected to other external interfaces and/or devices. I/O controller(s) 622 may be configured to detect particular wake signals over such interfaces and/or from such devices while the actual controller used for the interface is, being located elsewhere in SoC 100 outside of PMC 110, powered down. In response to detecting the wake signal, PMC 110 is capable of powering up the particular power domain in which the actual controller is located.

Figure 7:
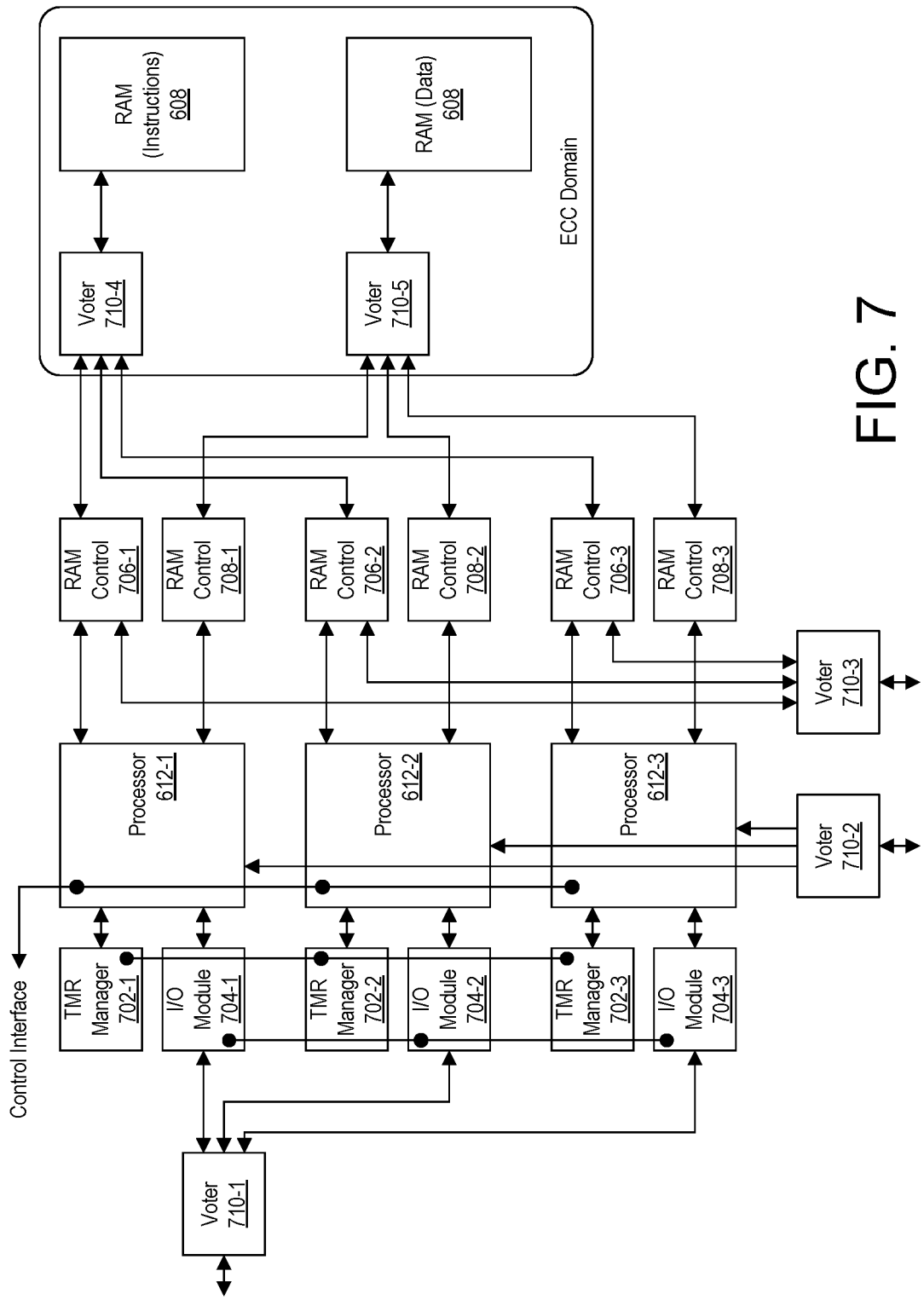
FIG. 7 illustrates an example redundant implementation of a processor in the PMC.

FIG. 7 illustrates an example redundant implementation of a processor in PMC 110. In the example of FIG. 7, processors 612 are arranged in a redundant architecture. More particularly, FIG. 7 illustrates a triple redundant architecture. In one example implementation, processors 612 are implemented as hardwired Microblaze processors, though other types of processors may be used.

Each processor 612 is connected to a Triple Modulo Redundancy (TMR) manager 702 and an I/O module 704. TMR managers 702-1, 702-2, and 702-3 are interconnected. I/O modules 704-1, 704-2, and 704-3 are also interconnected. Voter circuit 710-1 is coupled to each of the I/O modules 704. Each I/O module 704 may include an interrupt controller, a timer, a General Purposes I/O (GPIO), and/or a universal asynchronous receiver-transmitter (UART). Each TMR manager 702 is capable of managing the state of a respective one of processors 612, including fault detection and error recovery.

Each voter circuit 710 is capable of comparing the received input signals. Each voter circuit 710 is capable of detecting mismatched in the received signals and accepting the majority result and continue to operate. The particular processor 612 that provides the mismatched (e.g., losing result) is placed into reset while the other two remaining processors 612 continue to operate in lockstep. If all three processors 612 mismatch, each of the processors 612 are reset.

In the example of FIG. 7, each processor 612 is connected to a RAM control circuit 706 and a RAM control circuit 708. RAM control circuits 706 are connected to voter circuit 710, which connects to an instruction RAM, e.g., RAM 608. RAM control circuits 708 are connected to voter circuit 710-5, which connects to a data RAM, e.g., another RAM 608. As shown, RAM 608 and voter circuits 710-4 and 710-5 are part of the ECC domain. In the example of FIG. 7, each RAM control circuit 706 for the instruction RAM (e.g., 706-1, 706-2, and 706-3) is connected to voter circuit 710-3. Each of processors 612-1, 612-2, and 612-3 is connected to voter circuit 710-2. A control interface such as Advanced eXtensible Interface (AXI) 4-Lite or other suitable control interface is connected to each of processors 612-1, 612-2, and 612-3.

FIG. 7 illustrates an example of triple modular redundancy where processors 612 are dedicated to accessing RAM 608. In this regard, FIG. 7 illustrates an example of RAM dedicated processors 612. A similar architecture may be used for the ROM dedicated processors within PMC 110 as previously discussed. In another example, fewer than three processors 612 may be used where one or two processors (in lockstep) 612 are dedicated to executing code stored in the ROM 606 and one or two other processors (in lockstep) 612 are dedicated to executing firmware stored in RAM 608.

PMC 110 is the Root-of-Trust within the SoC 100. PMC 110 is capable of building a chain of trust by ensuring that any external code/data loaded by PMC 110 for configuring any portion of SoC 100 is authenticated and decrypted (if required). For example, PMC 110 is capable of performing authentication using authentication block 648 and/or hash block 650 and performing decryption using encryption/decryption block 646. In general, once configuration data is authenticated and decrypted by PMC 110, PMC 110 may load the configuration data into the appropriate configuration registers of the appropriate subsystems and/or circuit blocks of SoC 100.

Figure 8:
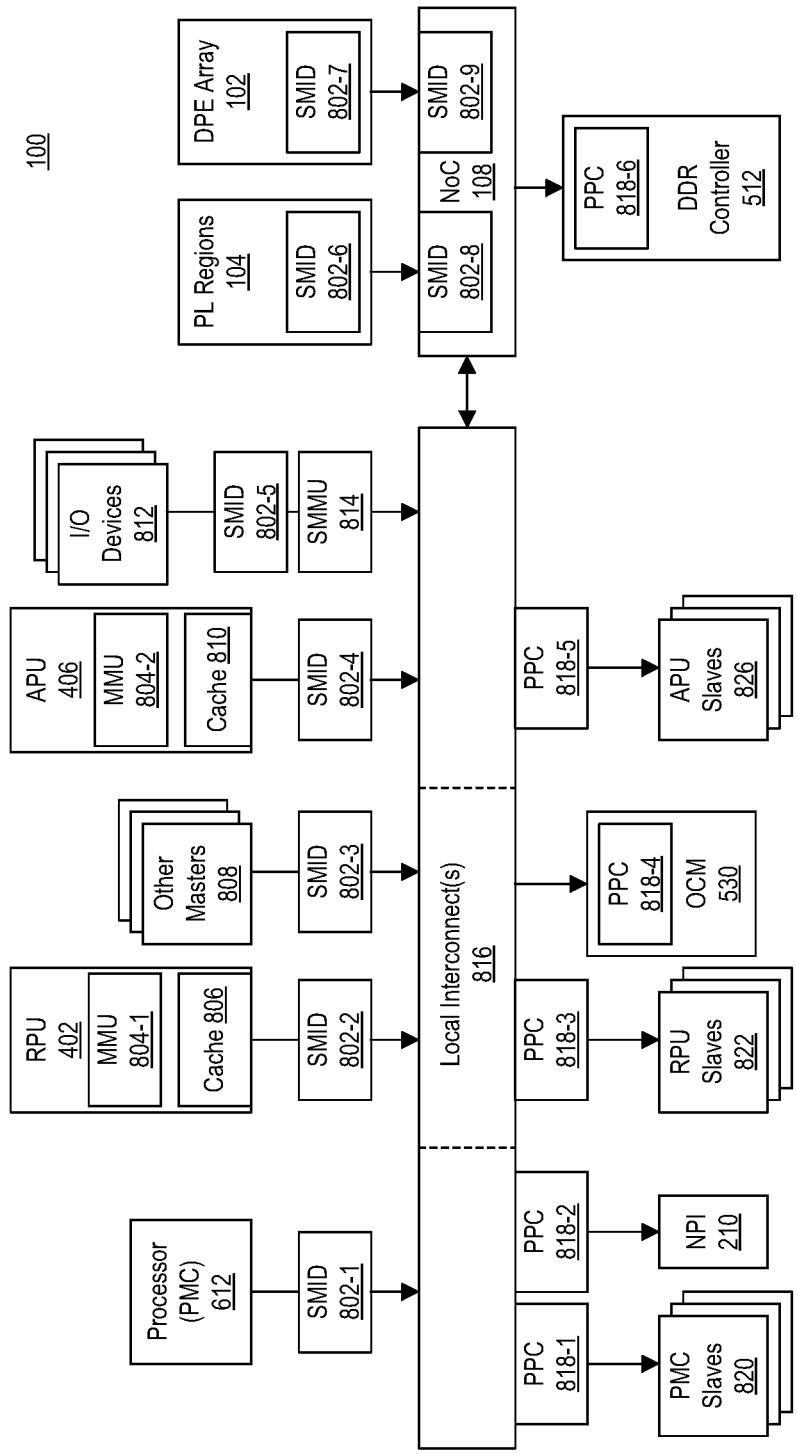
FIG. 8 illustrates further structural and functional aspects of an SoC.

FIG. 8 illustrates further structural and functional aspects of SoC 100. In the example of FIG. 8, SoC 100 includes a variety of additional circuits that are capable of implementing security features. These additional circuits may be used to create different and independent partitions in SoC 100 and implement firewalling among the different partitions. Each partition may execute its own application therein. In the example of FIG. 8, a plurality of System Management Identifier (SMID) circuits 802 and Programmable Protection Circuits (PPCs) 818 are included.

Processor 612, RPU 402, APU 406, other masters 808, and I/O devices 812 are connected to local interconnects 816 via SMID circuits 802. I/O devices 812 are further connected to local interconnects 816 via SMMU 814. Local interconnect 816 is connected to NoC 108. PL 104 and/or DPE array 102 are connected to NoC 108. RPU 402 includes a memory management unit (MMU) 804-1 and a cache 806. APU 406 includes an MMU 804-2 and a cache 810.

Each SMID circuit 802 is programmable to use a particular SMID. During configuration, PMC 110, e.g., processor 612, is capable of assigning and writing an SMID to the configuration registers in each of the various SMID circuits 802 or at least those SMID circuits 802 that are being used. The SMID circuit 802 for each of the various components, e.g., processor 612, RPU 402, APU 406, other masters 808, I/O devices 812, PL 104, and/or DPE array 102, is capable of attaching or inserting a SMID into the transactions initiated by the respective components. As such, each transaction originating from processor 612, for example, will include an SMID in the transaction that has been inserted by SMID circuit 802-2 as assigned by PMC 110. Similarly, each transaction originating from RPU 402 will have an SMID that has been inserted by SMID circuit 802-2 as assigned by PMC 110. In this manner, the source of the transactions from the various components in SoC 100 may be identified by the particular SMID within that transaction. The SMIDs assigned to the SMID circuits 802 may be unique across the SoC 100.

PPCs 818 are capable of protecting access to slave circuits within SoC 100. Each of PPCs 818 is capable of checking the particular SMID of each transaction entering the circuit block. Each of PPCs 818 is capable of checking whether the SMID of the transactions is an allowed SMID, e.g., on a list of allowed SMIDs maintained by the respective PPCs 818. Each of the PPCs 818 is also capable of checking that the address or address range to be accessed by a transaction is an address range for which the SMID is authorized to access. In this regard, PPCs 818 are capable of enforcing access privileges by ensuring that only authorized circuit blocks (based on SMID) are able to access other circuit blocks and further only access those address ranges for which the particular SMIDs are permitted.

In one aspect, PPCs 818 include a first type of circuit that is configured to protect configuration registers of circuit blocks. Such PPCs 818 are capable of allowing only authorized SMIDs to access the configuration registers and only those particular configuration registers having an address specified on the list of allowed address(es) for the respective allowed SMID(s). Examples of such PPCs 818 include, but are not limited to, PPCs 818-1, 818-2, 818-3, and 818-5. These PPCs 818 provide fine-grained protection. PPCs 818 may also include a second type that is configured to protect memories. The second type of PPC 818 provides memory protection and isolation. Examples of such PPCs 818 include, but are not limited to 818-4 and 818-6.

SMID circuits 802 and PPCs 818 are configured by PMC 110. For example, PMC 110 is capable of writing to the configuration registers in each of the SMID circuits 802 and each of the PPCs 818 used by a given design (e.g., per the PDI loaded into SoC 100). PMC 110, for example, assigns the SMIDs to the various circuit components of SoC 100 and configures SMID circuits 802 accordingly. PMC 110 further writes the list of allowed SMIDs and/or the permitted addresses and/or address ranges that each SMID is permitted to access into the configuration registers of PPCs 818. These operations, at least in part, are capable of creating two or more partitions in SoC 100 that are isolated from one another.

In this regard, PPC 818-1 is capable of allowing only authorized transactions from authorized sources to access PMC slaves 820. PPC 818-2 is capable of allowing only authorized transactions from authorized sources to access NPI 210. PPC 818-3 is capable of allowing only authorized transactions from authorized sources to access RPU slaves 822. PPC 818-4 is capable of allowing only authorized transactions from authorized sources to access OCM 530. PPC 818-5 is capable of allowing only authorized transactions from authorized sources to access APU slaves 826. PPC 818-6 is capable of allowing only authorized transactions from authorized sources to access DDR controller 512.

In the example of FIG. 8, the particular location of SMID circuits 802 and PPCs 818 is shown for purposes of illustration. SMID circuits 802 and PPCs 818 may be implemented within circuit blocks as part of an interface, within the signal path between circuit blocks, or the like. SMID circuits 802 and PPCs 818 may be implemented in different physical locations that provide logical equivalency. For example, a plurality of blocks may have an aggregated intermediary that attaches to a global pathway such as NoC 108. In that case, the aggregated intermediary may include SMID circuit 802 and/or PPC 818 as the case may be rather than each of the individual circuit blocks that aggregates through the intermediary. This may be true for both ingress and egress points in NoC 108.

In the example of FIG. 8, local interconnects 816 may represent one physical circuit block that is capable of merging multiple logical functions. In another example, NoC 108 may be implemented to include one or more SMID attach points. In other words, SMID circuits 802 (e.g., 802-6 and 802-7) may be implemented in NoC 108 (e.g., as SMID circuits 802-8 and 802-9) as opposed to within PL 104 and/or DPE array 102. SMID circuits 802 may be implemented in NoC 108 at ingress points, at egress points, or at a combination of ingress and egress points.

In the example of FIG. 8, the various connections to local interconnect 816 enter and exit NoC 108 by way of one gateway. Each port of NoC 108 is capable of receiving transactions from one logical source or from a plurality of logical sources. Similarly, each port of NoC 108 is capable of receiving transactions from one physical source or from a plurality of physical sources. A physical source may be a circuit block in a particular subsystem, while a different physical source is a different circuit block in a different subsystem.

For example, processor 612, RPU 402, and APU 406 each have an SMID circuit 802. Each of the processor 612, RPU 402, and APU 406 is capable of initiating transactions with the unique SMID assigned thereto based on the configuration performed by PMC 110. The transactions flow through to NoC 108 with their respective SMIDs to their destinations. Similarly, transactions from PL 104 or DPE array 102 each have the SMID inserted by SMID circuit 802-6 or SMID circuit 802-7, as the case may be. The transactions from PL 104 and DPE array 102 carry the SMIDs through to the destinations.

As an illustrative example, consider the case where a circuit block implemented in PL 104 initiates transactions A, B, and C. Each of transactions A, B, and C carries the SMID assigned by SMID circuit 802-6 (or SMID circuit 802-8 if implemented in NoC 108). If transaction A is directed to DDR controller 512, NoC 108 functions as both the ingress and egress pathway. PPC 818-6 is capable of checking that the circuit block in PL 104 has the right to access DDR controller 512 (e.g., based on SMID) and has the right to access the particular address(es) of memory specified by the transaction. PPC 818-6 is capable of rejecting transaction A when the source of transaction A does not have adequate rights.

Transaction B may be directed to a PMC slave 820, while transaction C is directed to an RPU slave 822. In the case of transaction B, PPC 818-1 checks whether the source of transaction B (based on the SMID) is permitted to access the particular PMC slave 820 specified by the transaction. In the case of transaction C, PPC 818-3 checks whether the source of transaction C (based on the SMID) is permitted to access the particular RPU slave 822 specified by the transaction. Each PPC 818-1 and PPC 818-3 permits the respective transaction or rejects the respective transaction based on the SMID and the particular target (e.g., particular PMC slave 820 or particular RPU slave 822) of the transaction. Thus, the logical functioning of the SMID attachment and the egress checking (e.g., as performed by PPCs 818) may be physically distributed within the SoC 100.

In another example, an I/O device 812 may be an external flash device from which a boot image is loaded into a first PMC slave 820. In this example, PMC slaves 820 may be memory slaves such as memories in which boot code is stored or registers for programming or configuring other blocks in SoC 100 such as a register set for configuring PL 104 and/or DPE array 102. In another example, the boot image may be program code from which processor 612 will boot. In this example, the various gateways, e.g., PPCs 818 and SMID circuits 802 have been configured by PMC 110 to only allow the boot image to be loaded into one particular PMC slave 820. Accordingly, the I/O device 812 is only permitted to write the contents of the image file to the designated, e.g., the first, PMC slave 820 as regulated by PPC 818-1. The I/O device 812 is not permitted to read or write to other PMC slaves 820.

Continuing with the example, processor 612 is authorized through the authentication scheme (to be described herein in greater detail) to load the boot image. For example, PPC 818-1 may be configured to permit, based on the SMID corresponding to SMID circuit 802-1, processor 612 to read the PMC slave 820 to which the boot image was stored by the I/O device 812 (which only had write access). Processor 612 is only able to read the boot image and decrypt the boot image into a second PMC slave 820, e.g., a working memory for processor 612. Processor 612 may then use the decrypted boot image stored in the second PMC slave 820 to program other configuration registers, e.g., by writing to a third PMC slave 820. The third PMC slave 820 may be configuration registers for PL 104 or configuration registers for other circuit blocks.

In another aspect, the RPU 402 may have a separate local interconnect than PMC 110 and/or the other processors of PS 106 (e.g., APUs 406). RPU 402, being suited for real-time operations, may operate on the low power domain previously described and, as such, have a separate local interconnect from the local interconnect of PMC 110 and/or the APU 406. This allows RPU 402 to react quickly to different events, e.g., real-time sensor data that may be received and/or processed by RPU 402.

Figure 9:
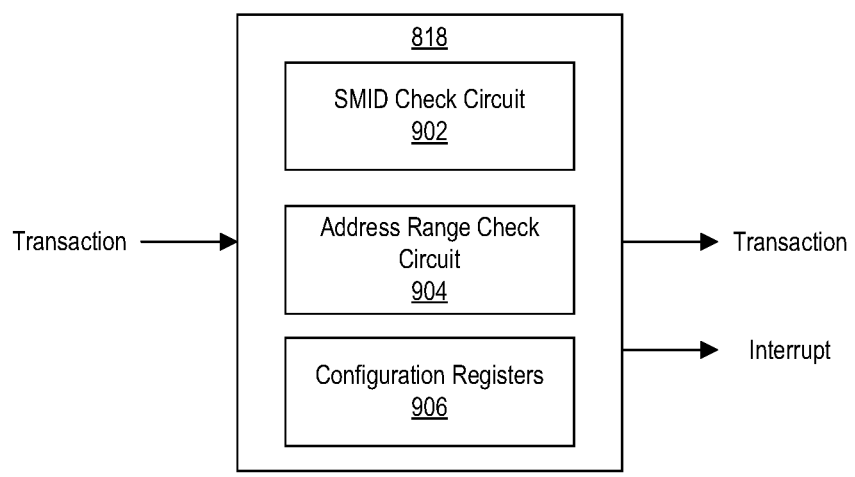
FIG. 9 illustrates an example implementation of a programmable protection circuit of FIG. 8.

FIG. 9 illustrates an example implementation of a PPC 818. PPC 818 includes an SMID check circuit 902, an address range check circuit 904, and configuration registers 906.

The SMID check circuit 902 is capable of checking the SMID of a received transaction. The SMID check circuit 902 determines the SMID within the received transaction and compares the SMID with a list of allowed SMIDs specified in the configuration registers 906. Address range check circuit 904 determines the particular address(es) that are to be accessed in the destination as specified by the transaction. The address range check circuit 904 checks whether the address(es) specified in the received transaction are within an allowed set or range of addresses for the SMID of the transaction per the configuration registers 906.

PPC 818 is capable of disallowing (e.g., rejecting) any transaction that does not meet the checks performed by SMID check circuit 902 and address range check circuit 904. PPC 818 is further capable of generating an interrupt signal in response to determining that a received transaction is rejected based on the checks performed by the SMID check circuit 902 and/or the address range check circuit 904.

Figure 10:
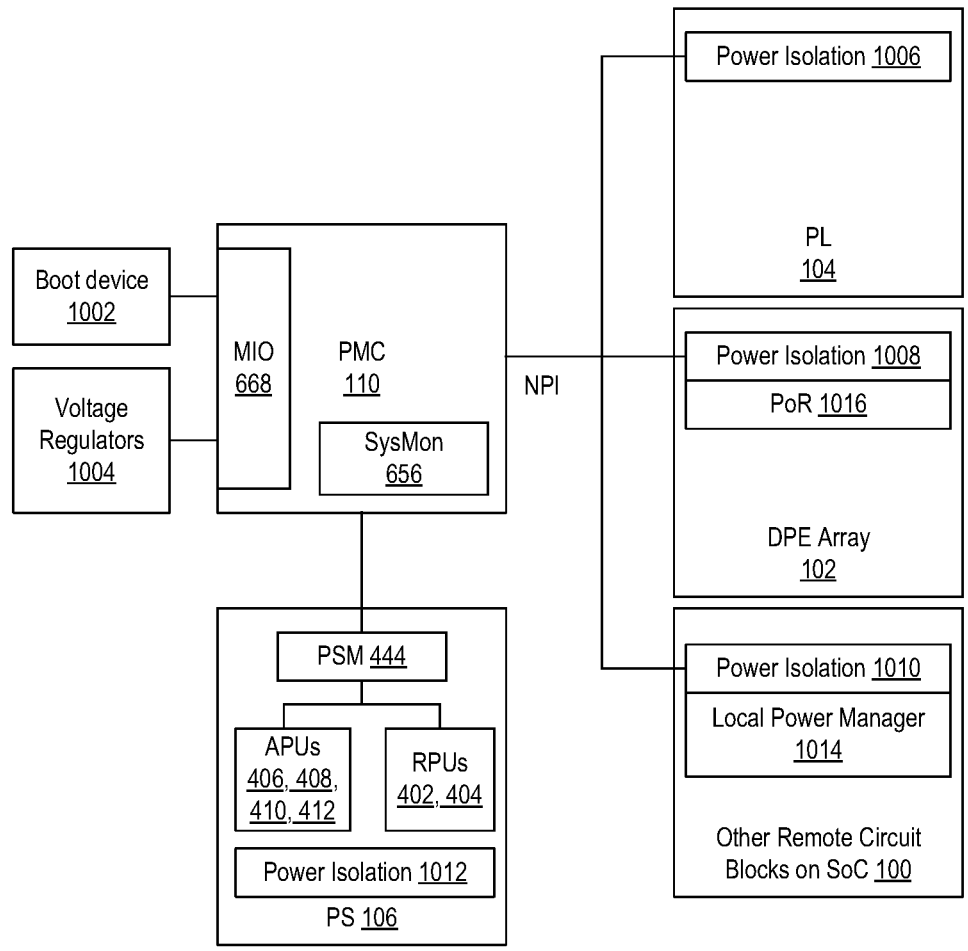
FIG. 10 illustrates example features of a PMC.

FIG. 10 illustrates example features of PMC 110. In the example of FIG. 10, PMC 110 is capable of controlling power-up and power-off of various subsystems in SoC 100. In the example of FIG. 10, PMC 110 is connected to a boot device 1002. Boot device 1002 may be a memory located off-chip or external to SoC 100. Boot device 1002 may be disposed on the same circuit board as SoC 100. In one example, boot device 1002 is a flash memory. PMC 110 is capable of coupling to boot device 1002 via MIO 668 and a suitable I/O controller 622 (e.g., a flash memory controller) as discussed in connection with FIG. 6.

PMC 110 operates as the main power manager for SoC 100. PMC 110, for example, executes firmware that is capable of controlling implementation of different power modes (e.g., low power mode or power off and power on) across SoC 100. PMC 110 is also responsible for managing the power rails within SoC 100. In one aspect, each different power domain in SoC 100 may be connected to its own set of power rails controlled by PMC 110. Within this disclosure, the term "power domain," used in reference to SoC 100, means a set of components of SoC 100 that are powered by a same or common set of power rails. In one aspect, each different subsystem is an example of a power domain. Thus, power domains within SoC 100 include PL 104, PS 106, NoC 108, and selected ones of hardwired circuit blocks 112. As discussed, PS 106 may include two different power domains.

In the example of FIG. 10, PMC 110 is also connected to one or more voltage regulators 1004. Voltage regulators 1004 are external to SoC 100 and may be located on the same circuit board as SoC 100. In one aspect, PMC 110 is connected to voltage regulators 1004 via MIO 668 and a suitable I/O controller 622 such as I2C, PM Bus, or other suitable I/O controller. PMC 110, e.g., the PMC processing unit 602, is capable of communicating with voltage regulators 1004 and sending instructions to turn on or turn off any of the various power rails (e.g., power supply lines) in SoC 100 controlled by voltage regulators 1004 so as to turn on or turn off any of the power domains of SoC 100. Further, PMC 110 is capable of instructing the voltage regulators 1004 to provide specific voltages for particular ones of the power rails in SoC 100. As such, PMC 110 is capable of powering on or powering off any power domain independently of each other power domain.

In one aspect, PMC 110 is directly connected to PS 106. More particularly, PMC 110 may be directly connected to PS manager 444. PS manager 444 may be implemented as a hardwired processor that is capable of executing program code. As part of the boot process for PS 106, PMC 110 is capable of accessing firmware for PS manager 444, authenticating the firmware, and providing the firmware to PS manager 444. PMC 110, for example, may place the firmware in RAM of PS 106 for execution by PS manager 444.

In general, PS 106 includes a variety of different circuit resources. While PMC 110 is capable of controlling PS 106, PMC 110 need not be aware of the details relating to control of the many different components included in PS 106. PS manager 444, however, is capable of controlling the various components within PS 106 in detail. For example, PMC 110 may send instructions to PS manager 444 instructing PS 106 to transition from a first power mode to a second and different power mode. This transition may involve powering on some power islands in PS 106 and powering off other power islands in PS 106. In one aspect, PS manager 444 is capable of controlling header cells (e.g., power switches) in PS 106 to power on and/or power off power islands in PS 106 per the instructions from PMC 110. As used herein, the term "power island," means one or more components that are part of a same power domain that are powered on or off by way of a power switch that is within SoC 100. Thus, a power domain may include a plurality of power islands that may be powered on presuming the power rail for the power domain is powered on. The power islands may be powered off independently of one another, where each is under control of a switch that is on SoC 100. PS manager 444 is capable of controlling these switches corresponding to power islands within PS 106 and/or for other power domains.

As an illustrative and non-limiting example, each peripheral device within the first power domain or within the second power domain of PS 106 may be an individual island. While PMC 110 controls powering on and off of power domains through communication with voltage regulators 1004 that are off-chip, PMC 110 is capable of controlling powering on and off of power islands by providing instructions to PS manager 444 and/or other power managers in other domains.

PS manager 444 is capable of performing a more detailed power on and power off procedure for each individual power domain and/or power island in PS 106 in response to instructions received from PMC 110. For example, were each component in a power island (or power domain) to be turned on concurrently, a large rush of current may be created in SoC 100 that may be damaging to the circuitry. PS manager 444 is capable of sequencing the power on and power off of components in each individual power island and/or power domain to avoid a large surge in current. PMC 110 need not be aware of the detailed procedures performed by PS manager 444.

In particular implementations, each of the different power domains has power isolation circuitry 1006, 1008, 1010, and 1012. The power isolation circuitry allows one power domain to be powered off while other power domains remain powered on. PMC 110 is capable of controlling (e.g., enabling and disabling) power isolation circuitry 1006, 1008, 1010, and 1012 to facilitate independent powering on and off of the various power domains. In one aspect, power isolation circuitry is implemented to include clamps and level shifters that exist between power rails for power domains within SoC 100.

In the example of FIG. 10, local power manager 1014 is included. The example of FIG. 10 illustrates an implementation where one or more local power managers may be included to manage and/or control one or more other remote circuit blocks (e.g., hardwired circuit blocks 112) implemented in SoC 100. Local power manager 1014, for example, is capable of controlling power islands within these other circuit blocks. As an illustrative and non-limiting example, a VCU circuit block may be a power domain in and of itself and include a plurality of different power islands. Not every component in the VCU circuit block may be needed all of the time. Local power manager 1014 is capable of managing power on and power off (e.g., the sequencing of components in the various power islands powering on and powering off) of the power islands within the VCU circuit block. Local power manager 1014, for example, (like PS manager 444), is capable of sequencing the activation or deactivation of the header cells (switches) for the power islands in the particular circuit blocks that are managed.

DPE array 102 may include power on reset (POR) circuitry 1016. POR 1016 is capable of initializing DPE array 102 once powered on. PMC 110 is capable of controlling operation of POR 1016.

In the example of FIG. 10, PMC 110 includes system monitor (SysMon) 656. System monitor 656 is capable of monitoring the voltage of the internal rails of SoC 100. Thus, while PMC 110 is capable of providing instructions to voltage regulators 1004 to power particular rails at particular voltages, PMC 110, via system monitor 656, is capable of monitoring the voltage of the rails within SoC 100 to ensure (e.g., validate) that the voltage of the rails as measured within SoC 100 conforms with the expected voltage based on the instructions provided from PMC 110 to voltage regulators 1004. In one aspect, PMC 110 does not consider a power domain to be powered on until the voltage for the rails corresponding to the power domain has reached an expected voltage as determined by System monitor 656. PMC 110, for example, verifies that the voltage of the rails determined by system monitor 656 reaches the target voltage for the power domain prior to instructing the relevant isolation circuits for the power domain to deactivate. System monitor 656 is also capable of performing the same or similar validation with regard to temperature. System monitor 656, for example, may measure temperature at one or more locations across SoC 100 (e.g., across the different subsystems) and compare the measured temperatures to expected temperatures at each respective location. Appreciably, the expected temperature at one location may differ from the expected temperature at another location.

Figure 11:
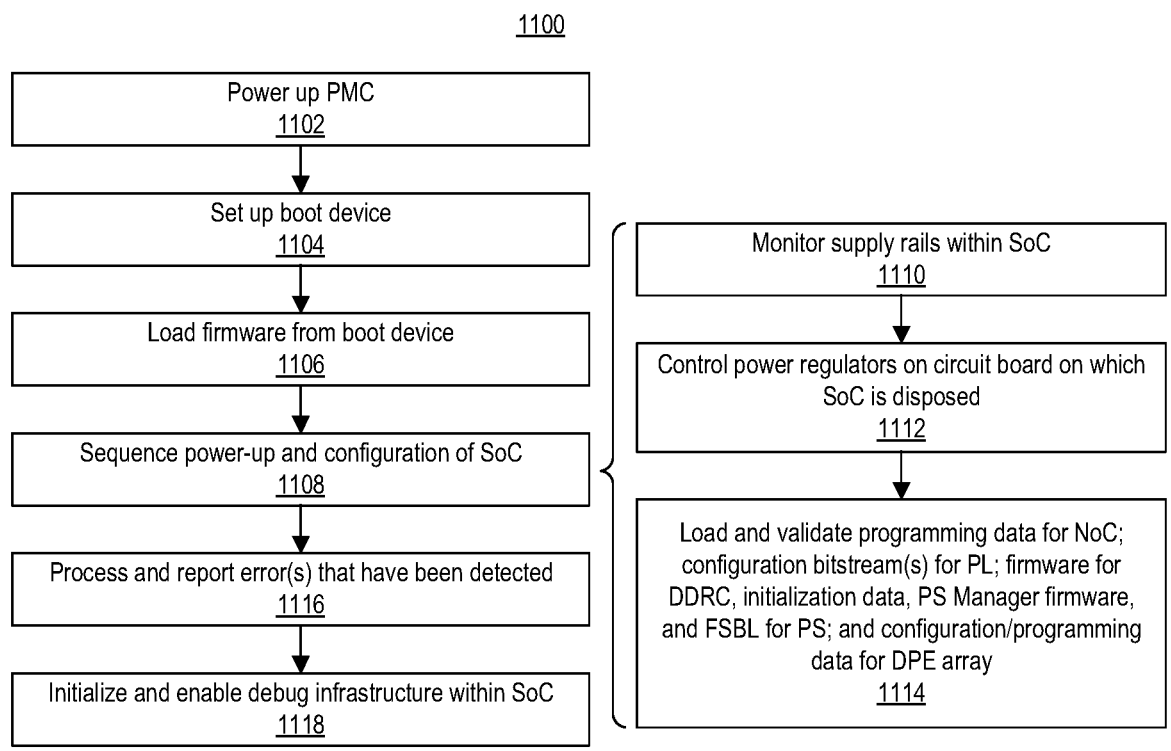
FIG. 11 illustrates an example method of booting an SoC.

FIG. 11 illustrates an example method 1100 of booting SoC 100. In general, method 1100 includes two different phases. Phase 1 includes blocks 1102, 1104, and 1106. Phase 1 includes operations that are considered pre-firmware. More particularly, operations performed in phase 1 are operations performed by hardwired circuitry or logic or are operations defined by program code stored in ROM(s) 606 of PMC processing unit 602 referred to as BootROM. The BootROM is executable by processor(s) 612 dedicated to accessing ROM(s) 606 (hereafter the "ROM PMC processor"). The operations performed in phase 2 are firmware operations. The operations performed in phase 2 are defined by firmware that is loaded into RAM(s) 608 from sources external to SoC 100 for execution by processors 612 dedicated to RAM(s) 608 (hereafter the "RAM PMC processor").

In block 1102, PMC 110 is powered up. PMC 110, for example, includes logic that is capable of powering on PMC 110. In block 1104, PMC 110 sets up a boot device external to SoC 100. For example, the ROM PMC processor is capable of starting execution of the BootROM from ROM(s) 606 to access the boot device. In block 1106, the ROM PMC processor loads firmware stored on the boot device. The ROM PMC processor is capable of authenticating the firmware loaded from the boot device. As generally discussed in connection with FIG. 6, the ROM PMC processor, in executing the BootROM, is capable of routing the firmware to one or more blocks in security accelerators 632 for purposes of authentication and/or decryption. Further, the ROM PMC processor is capable of loading the firmware into RAM of PMC 110. The firmware may be contained within a PDI.

Phase 2 includes blocks 1108 (including blocks 1110, 1112, and 1114), 1116, and 1118. In phase 2, PMC 110 begins building the initial system within SoC 100. For example, the RAM PMC processor begins executing the firmware loaded into RAM(s) 608. In block 1108, the RAM PMC processor is capable of sequencing power-up and configuration of the remainder of SoC 100. The RAM PMC processor sequences the power-up based on execution of the firmware. Thus, the firmware loaded into SoC 100 defines the sequence of power-up and configuration of SoC 100 beyond the operations performed during phase 1.

Blocks 1110, 1112, and 1114 illustrate example operations that may be performed as part of block 1108. In block 1110, for example, the RAM PMC processor is capable of monitoring supply rails within SoC. In block 1112, the RAM PMC processor is capable of controlling power regulators on the circuit board on which SoC 100 is disposed. In block 1114, the RAM PMC processor is capable of loading, authenticating and/or decrypting a PDI that may include programming data for NoC 108; configuration bitstream(s) for PL 104; firmware for DDRC (DDR controller), initialization data, PS manager firmware, and a first-stage boot loader (FSBL) for PS 106; and configuration/programming data for DPE array 102.

In block 1116, the RAM PMC processor processes and reports any errors that may have been detected. In block 1118, the RAM PMC processor initializes and enables the debug infrastructure within SoC 100.

Method 1100 illustrates a process where PMC 110 utilizes BootROM and/or hardware (e.g., dedicated logic) to bring up particular portions of SoC 100 prior to the loading of firmware. Variation in operation of SoC 100 during this boot mode may be controlled via I/Os to SoC 100 and/or e-fuses. The initial firmware execution sets up the initial system within SoC 100 per the particular PDI that is loaded. Further, execution of the firmware prepares PMC 110 for responding to future service requests. PMC 110, in executing the firmware, also performs operations such as configuration of SoC 100 and/or subsystems of SoC 100, partial reconfiguration of SoC 100 and/or subsystems of SoC 100, power management, error processing, and system checks.

Figure 12:
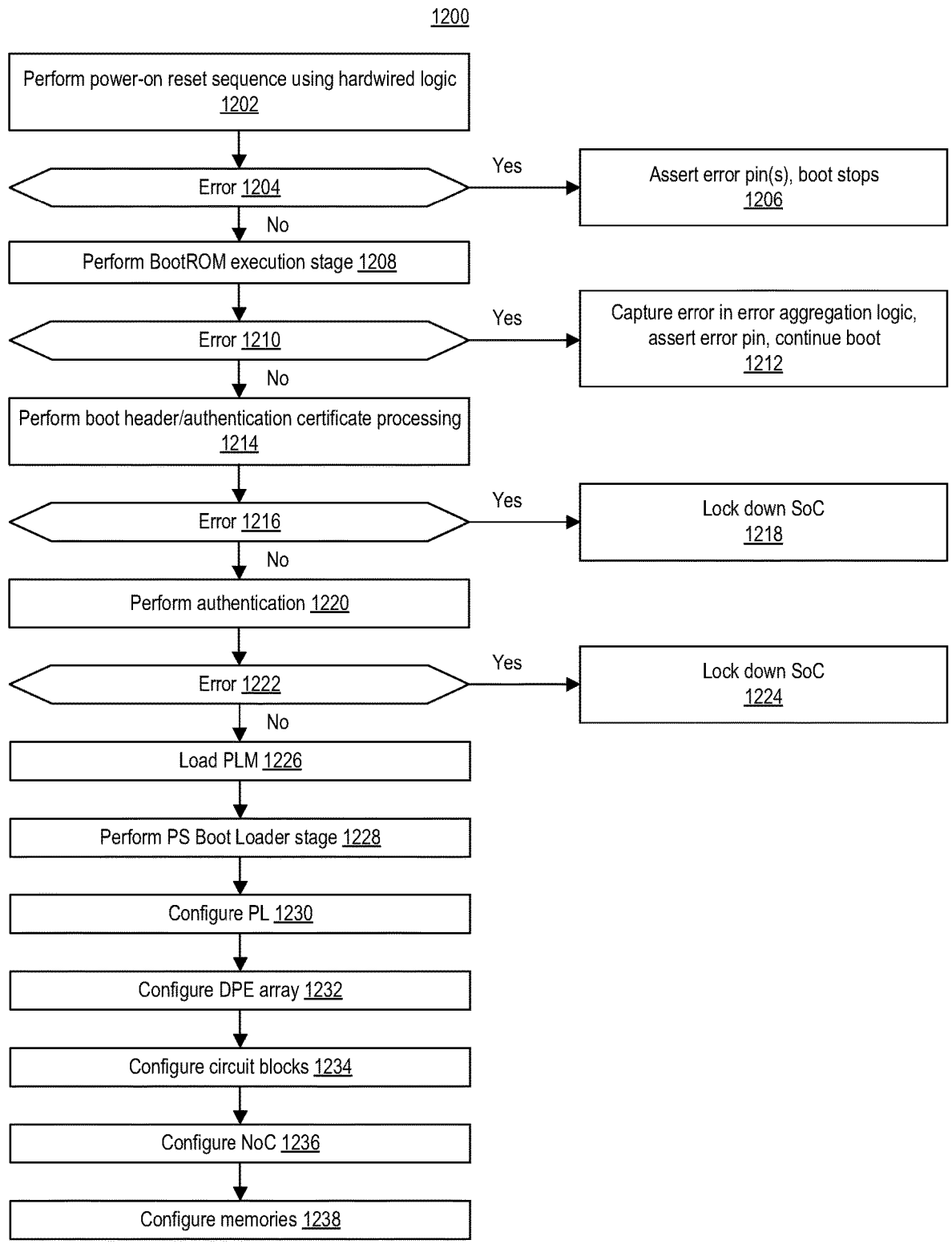
FIG. 12 illustrates another example method of booting an SoC.

FIG. 12 illustrates another example method 1200 of booting SoC 100. Method 1200 may be performed to implement an application within SoC 100 that utilizes the various subsystems described herein.

In block 1202, hardwired logic within PMC 110 performs a power-on reset sequence. In one aspect, the hardwired logic is the POR circuit 666 described in connection with FIG. 6. The power-on reset sequence refers to initial operations performed after power-up of SoC 100. In general, the power-on reset sequence, as performed by SoC 100 performs initial steps prior to handing off control to the ROM PMC processor to execute the BootROM code in ROM(s) 606. The power-on reset sequence may include analog components detecting whether the voltage supply is powered up and qualifying the power-on reset de-assertion. Further, boot-mode pins that specify a boot-mode for the SoC 100 may be captured. E-fuse bits may be read and cached by e-fuse controller 660. A state-clear operation is performed on PMC 110 (e.g., zeroization). In one aspect, POR circuit 666 is capable of authenticating the BootROM stored in ROM(s) 606. The BootROM may be authenticated using hash circuit block 650 of PMC 110, for example. The end of the power-on reset releases the remainder of PMC 110 from reset.

In block 1204, POR circuit 666 determines whether an error condition occurred. If so, method 1200 continues to block 1206 where error pin(s) are asserted and the boot process for SoC 100 stops.

In block 1208, PMC 110 performs the BootROM execution stage. The BootROM execution stage may be performed by the ROM PMC processor. In one aspect, the BootROM execution stage is uninterruptable. For example, in block 1208, the ROM PMC processor clears the PMC shared RAM 618. The ROM PMC processor initializes the system monitor 656 so that system monitor 656 may check voltages within SoC 100 (e.g., on an ongoing basis for continued detection of tampering). The ROM PMC processor initializes PLL 664 and ensures that PLL 664 achieves lock. The ROM PMC processor tests the PMC shared RAM 618. The ROM PMC processor further disables (powers down) the power islands that are disabled by virtue of the e-fuses based on the e-fuse data read by e-fuse controller 660. The ROM PMC processor further is capable of setting up PS 106 and NoC 108, if applicable.

In block 1210, the ROM PMC processor determines whether an error condition occurred for any of the operations performed during the BootROM execution stage of block 1208. If so, method 1200 continues to block 1212 where the error is captured in error aggregation logic, the error pin(s) are asserted, and the boot of the SoC 100 continues.

In block 1214, the ROM PMC processor performs boot header/authentication certificate processing. In general, the ROM PMC processor executes the BootROM code, loads the Boot Header from the boot source, and authenticates the Boot Header. In general, the Boot Header specifies the subsequent actions to be performed by PMC 110. The actions may include loading the PLM from the PDI to be executed on the RAM PMC processor, which optionally may be followed by configuration of PL 104 and/or configuration of DPE array 102. The PLM includes a secure header and one or more blocks of firmware code.

As part of block 1214, the ROM PMC processor is capable of processing the Boot Header and authentication certificate from the PDI. The ROM PMC processor, in executing the BootROM, is capable of authenticating and decrypting, if required, and loading the PLM or the PMC firmware into PMC shared RAM 618. For example, the ROM PMC processor may load the Boot Header and the authentication certificate into PMC shared RAM 618 from the external boot device. The ROM PMC processor is capable of determining how the remainder of the PDI is authenticated, decrypted if necessary, and interpreted based on the Boot Header. The ROM PMC processor, from the Boot Header, determines subsequent actions to be performed such as loading the PLM to be executed by the RAM PMC processor and optionally configuring PL 104 and/or DPE array 102. The Boot Header may include an initialization vector to be used with the device-key and a PUF encrypted black key. The authentication certificate may include the primary public key (e.g., the ECDSA/RSA primary public key) and the secondary public key. The primary public key is used to authenticate the secondary public key and for subsequent stages of authentication.

For example, e-fuses of SoC 100 may store a hash value of the public key. The ROM PMC processor is capable using the security accelerators 632 to generate a hash of the public key which is obtained from the Boot Header and comparing the generated hash value with the hash value stored in the e-fuses. With the public key authenticated as described, the ROM PMC processor may store the public key into a key register within PMC 110 for use in all verification actions until the public key is changed.

In block 1216, the ROM PMC processor determines whether an error condition occurred. If so, method 1200 continues to block 1218 where SoC 100 is locked down, e.g., boot discontinues. In one aspect, a "lock down state" of SoC 100 is a state in which PMC 110, in response to detecting an error, clears or erases all data (e.g., memory contents) and configuration data in SoC 100 across all subsystems (e.g., DPE array 102, PL 104, PS 106, NoC 108, and within PMC 110). For purposes of illustration, the errors described in connection with blocks 1216 and 1222 may be considered "tamper events" that initiate the lock down state for SoC 100. Other examples of events that may be considered tamper events that, when detected by PMC 110, cause PMC 110 to initiate the lock down state or other error recovery procedures include, but are not limited to, temperature out of range (e.g., higher or lower than a defined temperature range), voltage out of range (e.g., higher or lower than a defined voltage range), an illegal access of a circuit block by another circuit block and/or system, and lack of authentication of any configuration data and/or program code loaded into SoC 100. Any of the foregoing tamper event examples may be detected during power on or boot and/or anytime thereafter during operation of SoC 100.

In block 1220, the ROM PMC processor, in executing the BootROM, is capable of performing authentication. The ROM PMC processor, for example, is capable of loading, authenticating, and decrypting the programming partitions of the PDI. In one example, the configuration information for different subsystems (e.g., DPE array 102, PL 104, and/or PS 106) may be specified as different partitions in a same PDI. In that case, the different subsystems may be configured one after another as part of bring up for SoC 100. In another example, the configuration information for different subsystems may be specified in different PDIs. In that case, the subsystems may be configured on demand and as needed.

In accordance with the inventive arrangements described herein, processing PDI partitions requires the partition to be authenticated using the techniques described herein (e.g., one of the security accelerators 632) before the partition is decrypted and used. As such, the configuration images that are being authenticated must first be stored within SoC 100, e.g., in PMC 110 for processing as described. The partitions may only be used to program portions of SoC 100 after being authenticated.

In block 1222, the ROM PMC processor determines whether an error condition occurred. If so, method 1200 continues to block 1224 where SoC 100 is locked down, e.g., boot discontinues.

In block 1226, the ROM PMC processor loads the PLM. The PLM may include a secure header followed by one or more blocks of firmware code. If so configured in the e-fuse and/or the Boot Header, the entire PLM may be authenticated using hash block 650 (e.g., ECDSA/RSA). If the authentication passes, the secure header is decrypted using the decryption circuitry and the device key. The secure header contains an AES-key to decrypt the next block of PLM or the rest of the PLM.

Once the PLM is loaded and authenticated by the ROM PMC processor, execution passes from the ROM PMC processor to the RAM PMC processor. The RAM PMC processor is capable of performing configuration tasks such as loading the PS boot loader for PS 106, configurating SoC 100 blocks such as NoC 108, DDR controller 512, GTs 528, DPE array 102 through NPI 210, and/or loading configuration bitstream(s) (e.g., whole or partial) into PL 104 for configuration thereof.

As discussed, the RAM PMC processor, executing the firmware, is capable of performing any of a variety of operations depending on the instructions contained in the firmware. For example, in block 1228, the RAM PMC processor is capable of performing a PS boot loader stage. The RAM PMC processor is capable of loading the PS boot loader from an external source, authenticating the PS boot loader, and copying the PS boot loader to OCM 530 in PS 106 for execution by PS processor(s). Once copied to OCM 530, the RAM PMC processor releases PS 106 from reset. PS 106 may execute the PS boot loader.

In block 1230, the RAM PMC processor, in executing the firmware, is capable of configuring PL 104. For example, the RAM PMC processor is capable of loading configuration bitstream(s) from the external source, authenticating the configuration bitstream(s), and providing the configuration bitstream(s) to PL 104 (e.g., writing the configuration bitstream to the configuration registers of PL 104).

In block 1232, the RAM PMC processor is capable of configuring DPE array 102. The RAM PMC processor is capable of loading a DPE array programming segment (e.g., the configuration image for the DPE array) from the external source, authenticating the DPE array programming segment, and writing the DPE programming segment to the appropriate destination (particular DPEs 302 in DPE array 102) via NPI 210 and NoC 108.

In block 1234, the RAM PMC processor is capable of configuring one or more circuit blocks. The circuit blocks may be hardwired circuit blocks or circuit blocks implemented in PL 104 that require configuration data, e.g., programming of configuration registers therein. The RAM PMC processor is capable of loading register-programming segments from the external-source, authenticating the register-programming, and writing the register-programming to destinations via NPI 210 and NoC 108. As an illustrative and non-limiting example, the RAM PMC processor is capable of writing register data to hardwired circuit blocks such as memory controllers, cryptographic circuit blocks, video codecs, DACs, ADCs, etc. In another aspect, the RAM PMC processor is also capable of writing register data to SMID circuit blocks 802 and/or PPCs 818.

In block 1236, the RAM PMC processor is capable of configuring NoC 108. As an illustrative and non-limiting example, the RAM PMC processor is capable of configuring NoC 108 to establish data paths connecting endpoint circuits. In block 1238, the RAM PMC processor is capable of configuring any memories. For example, the RAM PMC processor is capable of writing configuration data to any memory controllers and/or interfaces to external memory accessible by SoC 100.

The various operations performed as a consequence of loading the PLM in block 1226 by the RAM PMC processor may or may not be independent of one another. In some cases, the operations may be performed in a synchronized manner. For example, though not explicitly described, images for the NPI 210 may be loaded prior to being able to configure the PL 104 and/or DPE array 102. The particular ordering of blocks 1228-1238 is not intended to be limiting of the inventive arrangements.

FIG. 12 illustrates that the PMC 110 is responsible for configuring PS 106, PL 104, DPE array 102, and selected other circuit blocks. In one or more other embodiments, e.g., depending on the Boot Header, PMC 110 is capable of configuring PS 106 with program code that allows PS 106 to configure PL 104 and DPE array 102. In that case, in response to configuring the PS in block 1228, blocks 1230, 1232, and 1234 may be performed by PS 106 as opposed to the RAM PMC processor in PMC 110.

As method 1200 progresses, each level in the progression either enables or disables authorization for components to access other components in SoC 100. The process described in connection with FIG. 12 is hierarchical in that authorization may be denied or granted to increasingly narrower subsets of subsystems and/or components in SoC 100.

Figure 13:
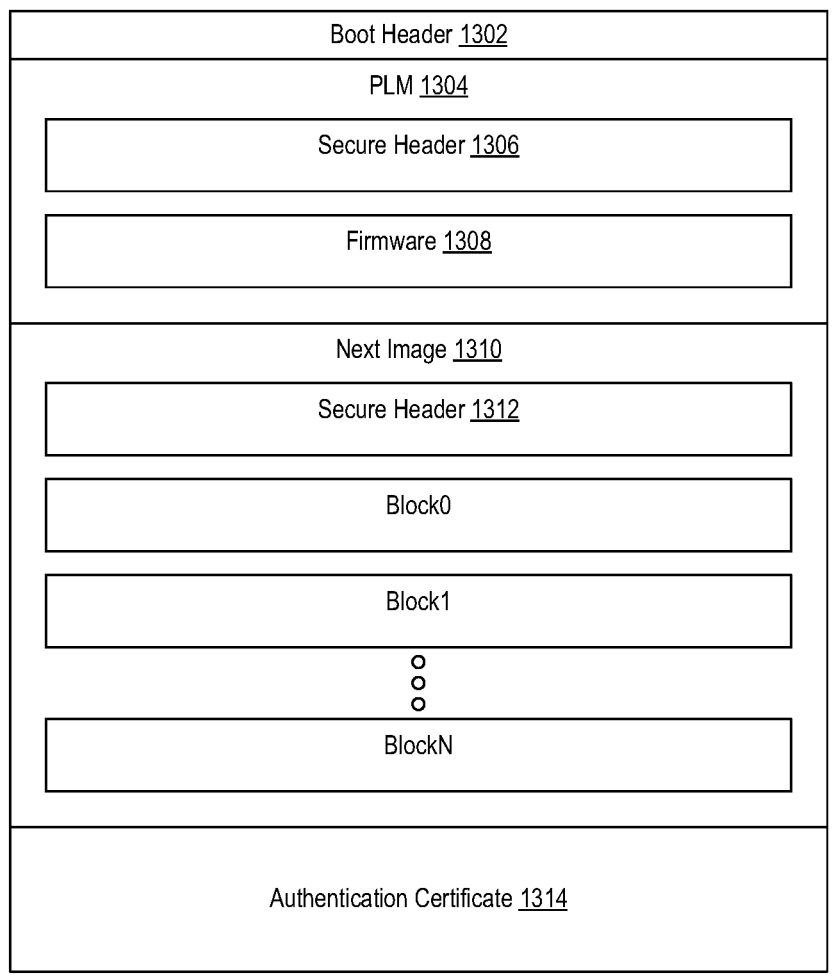
FIG. 13 illustrates an example of a programming device image that may be used to boot an SoC.

FIG. 13 illustrates an example of a PDI 1300 that may be used to boot SoC 100. In the example of FIG. 13, the PDI 1300 includes a Boot Header 1302. PDI 1300 further includes a PLM 1304. PLM 1304 may include a secure header 1306 and firmware 1308 that is executable by the RAM PMC processor of PMC 110. PDI 1300 also includes an authentication certificate 1314.

The next image 1310 of PDI 1300 may include a plurality of different blocks shown as block0, block1, through blockN. The various blocks contained in next image 1310 may be specified in secure header 1312. In general, the various blocks0-N correspond to the PS 106 boot code, the configuration bitstream(s) for PL 104, the DPE array programming segment, and the register programming data referenced in blocks 1228, 1230, 1232, and 1234 of FIG. 12. In particular embodiments, these blocks may be organized according to application (e.g., partition) where a plurality of blocks represent one application for implementation in a first partition, while a different set of blocks represent another application that may be implemented in a second partition concurrently with the first application or in the first partition after the first application is finished executing.

Partial reconfiguration of one or more portions of SoC 100 may be performed by PMC 110 selectively performing different ones of blocks 1228-1238 using available and/or different blocks or sets of blocks contained in PDI 1300 (or in different PDIs) over time and in response to particular conditions. Partial reconfiguration of SoC 100 facilitates layering into subsets or the entirety of physical components or their logical subsets in SoC 100. For example, PMC 110 is capable of controlling isolation of partitions, unloading (and loading) of software drivers (as appropriate for modified applications), delivery of programming images from any secondary boot interface, and image authentication and integrity checking before programming is done.

Figure 14:
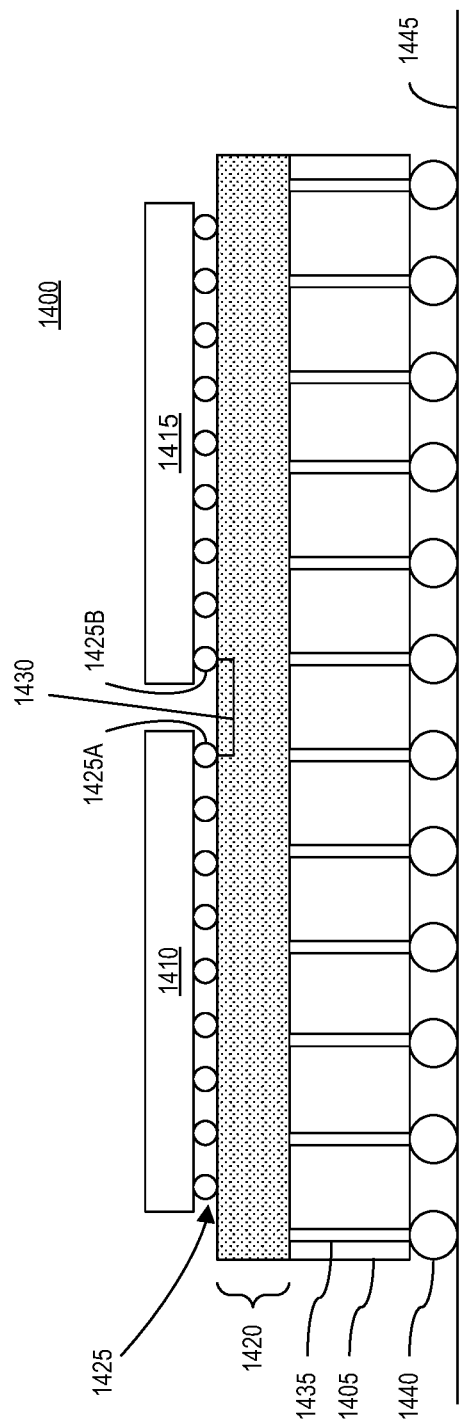
FIG. 14 illustrates an example of a cross-sectional side view of an IC structure having multiple dies.

FIG. 14 illustrates an example of a cross-sectional side view of an IC structure 1400. IC structure 1400 is a multi-die IC structure. IC structure 1400 illustrates an example of a packing approach to stacking multiple dies within a single package. As shown, IC structure 1400 can include a silicon interposer (interposer) 1405, a die 1410, and a die 1415.

Interposer 1405 can be a die having a planar surface on which dies 1410 and 1415 can be horizontally stacked. In general, interposer 1405 can be implemented with a silicon wafer substrate. As pictured, interposer 1405 can provide a common mounting surface and electrical coupling point for two or more dies of a multi-die IC structure. In one aspect, interposer 1405 can serve as an intermediate layer for interconnect routing between dies. In another aspect, interposer 1405 can serve as a ground or power plane for IC structure 1400.

Dies 1410 and 1415 can be located on the planar surface of interposer 1405 side-by-side. Although implemented with two horizontally stacked dies within FIG. 14, IC structure 1400 also can be implemented with more than two dies being horizontally stacked. In another aspect, die 1415 can be stacked vertically on top of die 1410. Interposer 1405 also can be used as an intermediate layer between two vertically stacked dies. In that case, for example, interposer 1405 can isolate vertically stacked dies from one another within a multi-die IC package.

Interposer 1405 can include interconnect region 1420 that includes one or more conductive layers. The conductive layers can be formed of material such as, for example, aluminum, gold, copper, nickel, various silicides, and/or the like. In one aspect, interposer 1405 can be implemented as an entirely passive structure that does not include any active circuit elements. In another aspect, however, one or more additional process layers can be added to interposer 1405 to create one or more active devices if so desired. In any case, interposer 1405 generally is characterized by the inclusion of one or more through-vias (TVs) and inter-die wires. TVs may be "through silicon vias" in the case where interposer 1405 is formed using silicon, though interposer 1405 may be formed of other suitable materials.

Each of dies 1410 and 1415 can be electrically coupled to interposer 1405 via a plurality of solder bumps 1425. In one aspect, solder bumps 1425 can be implemented as "microbumps." Each of solder bumps 1425 can serve to physically attach, e.g., couple, dies 1410 and 1415 to interposer 1405. Although the coupling of dies 1410 and 1415 to interposer 1405 is accomplished through solder bumps 1425, a variety of other techniques can be used to couple interposer 1405 to dies 1410 and 1415. For example, bond wires or edge wires can be used to couple dies 1410 and 1415 to interposer 1405. In another example, an adhesive material can be used to physically attach dies 1410 and 1415 to interposer 1405. As such, the coupling of dies 1410 and 1415 to interposer 1405 via solder bumps 1425 is provided for purposes of illustration and not limitation.

One or more conductive layers within interconnect region 1420 can be used to form inter-die wires between dies 1410 and 1415. For example, inter-die wire 1430 can be formed of one or more portions of a conductive layer, e.g., a patterned conductive layer. Vertical portions of inter-die wire 1430 can be formed of one or more vias of interconnect region 1420 that couple adjacent ones of conductive layers together. Inter-die wire 1430, for example, can be implemented within two or more conductive layers coupled together using vias within interposer 1405. The use of multiple conductive layers to implement interconnects within interposer 1405 allows a greater number of signals to be routed and more complex routing of signals to be achieved within interposer 1405. As shown, inter-die wire 1430 couples each of solder bumps 1425A and 1425B together, thereby allowing the exchange of inter-die signals between dies 1410 and 1415.

Solder bumps 1440 can be used to electrically couple interposer 1405 to a surface 1445. In one aspect, solder bumps 1440 can be implemented as controlled collapse chip connection or "C4" type bumps. Surface 1445 can represent a multi-die IC package, e.g., a substrate of a multi-die IC package, in which IC structure 1400 is implemented. For example, solder bumps 1440 can be used to physically attach interposer 1405 to surface 1445. As pictured, solder bumps 1440 can couple IC structure 1400 directly to a node external to IC structure 1400 and, for example, external to the multi-die IC package.

Interconnect region 1420 can be coupled to one or more TVs 1435. In general, each TV 1435 represents a via filled with conductive material that forms an electrical connection that vertically transverses, e.g., extends through a substantial portion, if not the entirety of, interposer 1405. Each TV 1435 can be formed of conductive material such as, for example, copper, aluminum, gold, copper, nickel, various silicides, and/or the like. As pictured, each TV 1435 can traverse substantially through interposer 1405 to couple a conductive layer, e.g., a wire, within interconnect region 1420 to a solder bump 1440. In this regard, each TV 1435 can forms a signal path from a solder ball 1440 to a solder bump 1425 through interconnect region 1420, thereby facilitating signal propagation into die 1410 and/or die 1415.

In an embodiment, interposer 1405 can be formed of material to provide interposer 1405 with a substrate resistivity that is higher than the substrate resistivity of die 1410 and higher than the substrate resistivity of die 1415. For example, interposer 1405 can be implemented using a material having a substrate resistivity on the order of approximately 40, or more, ohms per centimeter. In this regard, interposer 1405 can be implemented using a different process technology than is used to implement either one of dies 1410 and/or 1415. Conductive layers within interconnect region 1420, for example, can be implemented with greater thickness than conductive layers implemented within one or both of dies 1410 and 1415. In one example, conductive layers within interconnect region 1420 can be approximately four times the thickness of a conductive layer within either die 1410 and/or die 1415.

In the example of FIG. 14, each of dies 1410 and 1415 may be implemented to include one or more subsystems and a PMC 110. In a particular example, each of dies 1410 and 1415 may be implemented with an architecture the same as or similar to that described in connection with FIG. 1. For purposes of illustration, die 1410 is designated as a mater die while die 1415 is designated as a slave die. In the case where both dies 1410 and 1415 have NoCs, the NoCs of each die may be connected by inter-die wires, e.g., 1430, within interposer 1405.

Further, the PMC implemented in die 1410, being the master die, is considered the master PMC. The PMC within die 1415 operates as a slave to the PMC in die 1410. While the PMC in die 1415 is capable of performing the operations described herein, any data that is operated on and/or used in the PMC of die 1415 is received from the PMC in die 1410 as opposed to being received directly from a source external to IC structure 1400. In one aspect, only the PMC in die 1410 has access to I/Os to obtain data, e.g., firmware and/or PDIs, from sources external to IC structure 1400. As such, any firmware and/or PDIs used by the PMC in die 1415 are first retrieved by the PMC in die 1410 and provided to die 1415 by the PMC in die 1410. In any case, each die is configured by the PMC in that particular die.

In another embodiment, each PMC is equipped to perform encryption and decryption using keys specific to the die in which the PMC is included. For example, the key(s) to be used by a given PMC may be stored in the dedicated e-fuses in the same die as the PMC thereby allowing each PMC to use different key(s). In one aspect, only encrypted data is exchanged between the PMCs in different dies. As such, each PMC is capable of decrypting received encrypted data from the other PMC and encrypting data prior to sending the data to the other PMC.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a local area network (LAN), a wide area network (WAN) and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a programmable logic array (PLA) may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

An IC includes a processor system configured to execute program code, a programmable logic, and a platform management controller coupled to the processor system and the programmable logic. The platform management controller is adapted to configure and control the processor system and the programmable logic independently.

The platform management controller may include a dedicated read-only memory, a first processor dedicated to executing first instructions stored in the dedicated read-only memory, a dedicated random access memory, and a second processor dedicated to executing second instructions stored in the dedicated random access memory.

In another aspect, each of the first processor and the second processor is implemented with redundancy.

In another aspect, the first processor executes the first instructions from the dedicated read-only memory to perform a first stage of a boot process that obtains and authenticates the second instructions from an external source and stores the second instructions in the dedicated random access memory for execution by the second processor.

In another aspect, the first processor establishes the platform management controller as a Root-of-Trust for the IC.

In another aspect, the platform management controller is powered independently of the processor system and the programmable logic.

In another aspect, the processor system is powered independently of the programmable logic.

In another aspect, the platform management controller is configured to power down the processor system and the programmable logic independently of one another and to power on the processor system and the programmable logic independently of one another.

In another aspect, the platform management controller includes an interface and circuitry configured to detect a wake signal received via the interface. The platform management controller, in response to the wake signal, powers up a power domain of the IC that was previously powered down.

In another aspect, the platform management controller includes a debug interface that is accessible from external to the IC and that is accessible independently of the processor system and the programmable logic.

In another aspect, the platform management controller includes an error management interface configured to receive error notifications from the processor system and the programmable logic. The error management interface is configured to perform at least one of generating a signal that is output from the IC and that indicates a detected error or generating an interrupt to a processor within the platform management controller.

In another aspect, the platform management controller is configured to program protection circuits implemented throughout the IC that control functional and physical isolation between subsystems of the IC, wherein the subsystems include the processor system and the programmable logic.

In another aspect, the platform management controller is configured to detect a temperature out of range event or a voltage out of range event for the integrated circuit.

In another aspect, the platform management controller is configured to erase the IC in response to detecting the temperature out of range event or the voltage out of range event.

In another aspect, the platform management controller is configured to erase the IC in response to detecting the tamper event.

In another aspect, the IC includes a first die including the platform management controller and at least one of the processor system or the programmable logic. The IC further includes a second die including a further platform management controller operating as a slave to the platform management controller of the first die. The second die includes at least one of the processor system or the programmable logic.

In another aspect, the IC includes a processor array and a programmable network-on-chip connecting the processor array with the programmable logic and the platform management controller.

In another aspect, the platform management controller is adapted to configure the programmable network-on-chip and configure the processor array using the programmable network-on-chip once configured.

In another aspect, the platform management controller is configured to detect tamper events occurring in the IC and, in response, initiate a lock-down state.

A method includes providing a processor system on an IC, wherein the processor system is configured to execute program code. The method may include providing a programmable logic on the IC and providing a platform management controller on the IC. The platform management controller is coupled to the processor system and the programmable logic and is adapted to configure and control the processor system and the programmable logic independently.

In another aspect, the method includes providing, as part of the platform management controller, a dedicated read-only memory, a first processor dedicated to executing first instructions stored in the dedicated read-only memory, a dedicated random access memory, and a second processor dedicated to executing second instructions stored in the dedicated random access memory. The method can also include executing, using the first processor, the first instructions from the dedicated read-only memory to perform a first stage of a boot process that obtains and authenticates the second instructions from an external source and stores the second instructions in the dedicated random access memory for execution by the second processor.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. An integrated circuit, comprising:
    a processor system including one or more processors each configured to execute program code;
    a programmable logic coupled to the processor system, wherein the programmable logic is reconfigurable to implement user circuit designs;
    a platform management controller coupled to the processor system and the programmable logic; and
    wherein the platform management controller includes one or more processors configured to execute program code, and wherein the platform management controller is adapted to independently configure and control the processor system and the programmable logic to implement the user circuit designs therein.

2. The integrated circuit of claim 1, wherein the platform management controller comprises:
    a dedicated read-only memory;
    a first processor dedicated to executing first instructions stored in the dedicated read-only memory;
    a dedicated random access memory; and
    a second processor dedicated to executing second instructions stored in the dedicated random access memory.

3. The integrated circuit of claim 2, wherein each of the first processor and the second processor is implemented with redundancy.

4. The integrated circuit of claim 2, wherein the first processor executes the first instructions from the dedicated read-only memory to perform a first stage of a boot process that obtains and authenticates the second instructions from an external source and stores the second instructions in the dedicated random access memory for execution by the second processor.

5. The integrated circuit of claim 4, wherein the first processor establishes the platform management controller as a Root-of-Trust for the integrated circuit.

6. The integrated circuit of claim 1, wherein the platform management controller is powered independently of the processor system and the programmable logic.

7. The integrated circuit of claim 6, wherein the processor system is powered independently of the programmable logic.

8. The integrated circuit of claim 6, wherein the platform management controller is configured to power down the processor system and the programmable logic independently of one another and to power on the processor system and the programmable logic independently of one another.

9. The integrated circuit of claim 1, wherein:
    the platform management controller comprises an interface and circuitry configured to detect a wake signal received via the interface; and
    wherein the platform management controller, in response to the wake signal, powers up a power domain of the integrated circuit that was previously powered down.

10. The integrated circuit of claim 1, wherein the platform management controller comprises a debug interface that is accessible from external to the integrated circuit and that is accessible independently of the processor system and the programmable logic.

11. The integrated circuit of claim 1, wherein:
    the platform management controller comprises an error management interface configured to receive error notifications from the processor system and the programmable logic; and
    the error management interface is configured to perform at least one of generating a signal that is output from the integrated circuit and that indicates a detected error or generating an interrupt to a processor within the platform management controller.

12. The integrated circuit of claim 1, wherein the platform management controller is configured to program protection circuits implemented throughout the integrated circuit that control functional and physical isolation between subsystems of the integrated circuit, wherein the subsystems include the processor system and the programmable logic.

13. The integrated circuit of claim 1, wherein the platform management controller is configured to detect a temperature out of range event or a voltage out of range event for the integrated circuit.

14. The integrated circuit of claim 13, wherein the platform management controller is configured to erase the integrated circuit in response to detecting the temperature out of range event or the voltage out of range event.

15. The integrated circuit of claim 1, further comprising:
a first die including the platform management controller and at least one of the processor system or the programmable logic; and
a second die including a slave platform management controller and at least the other of the processor system or the programmable logic.

16. The integrated circuit of claim 1, further comprising:
a processor array; and
a programmable network-on-chip connecting the processor array with the programmable logic and the platform management controller.

17. The integrated circuit of claim 16, wherein the platform management controller is adapted to configure the programmable network-on-chip and configure the processor array using the programmable network-on-chip once configured.

18. The integrated circuit of claim 1, wherein the platform management controller is configured to detect tamper events occurring in the integrated circuit and, in response, initiating a lock-down state.

19. A method, comprising:
providing a processor system on an integrated circuit, wherein the processor system includes one or more processors each configured to execute program code;
providing a programmable logic coupled to the processor system on the integrated circuit, wherein the programmable logic is reconfigurable to implement user circuit designs; and
providing a platform management controller on the integrated circuit, wherein the platform management controller includes one or more processors configured to execute program code, and wherein the platform management controller is coupled to the processor system and the programmable logic and is adapted independently to configure and control the processor system and the programmable logic to implement the user circuit designs therein.

20. The method of claim 19, wherein the platform management controller is configured to program protection circuits implemented throughout the integrated circuit that control functional and physical isolation between subsystems of the integrated circuit, wherein the subsystems include the processor system and the programmable logic.

* * * * *